March 24, 1925.　1,530,852
A. H. PITNEY
PRINTING MECHANISM FOR PARCEL POST POSTAGE METER MACHINES
Filed Jan. 8, 1923　13 Sheets-Sheet 1
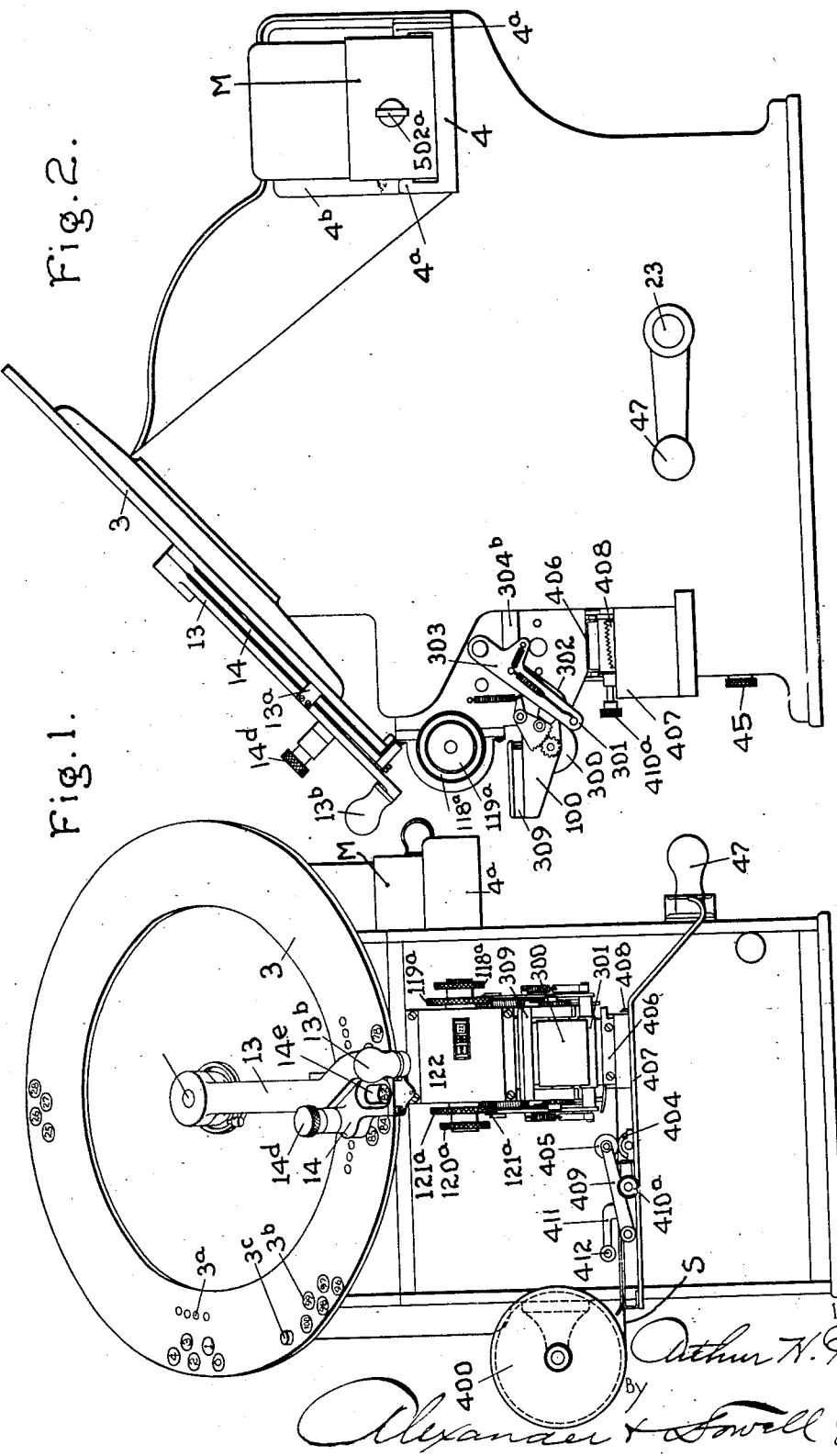

March 24, 1925.

A. H. PITNEY 1,530,852

PRINTING MECHANISM FOR PARCEL POST POSTAGE METER MACHINES

Filed Jan. 8, 1923  13 Sheets-Sheet 3

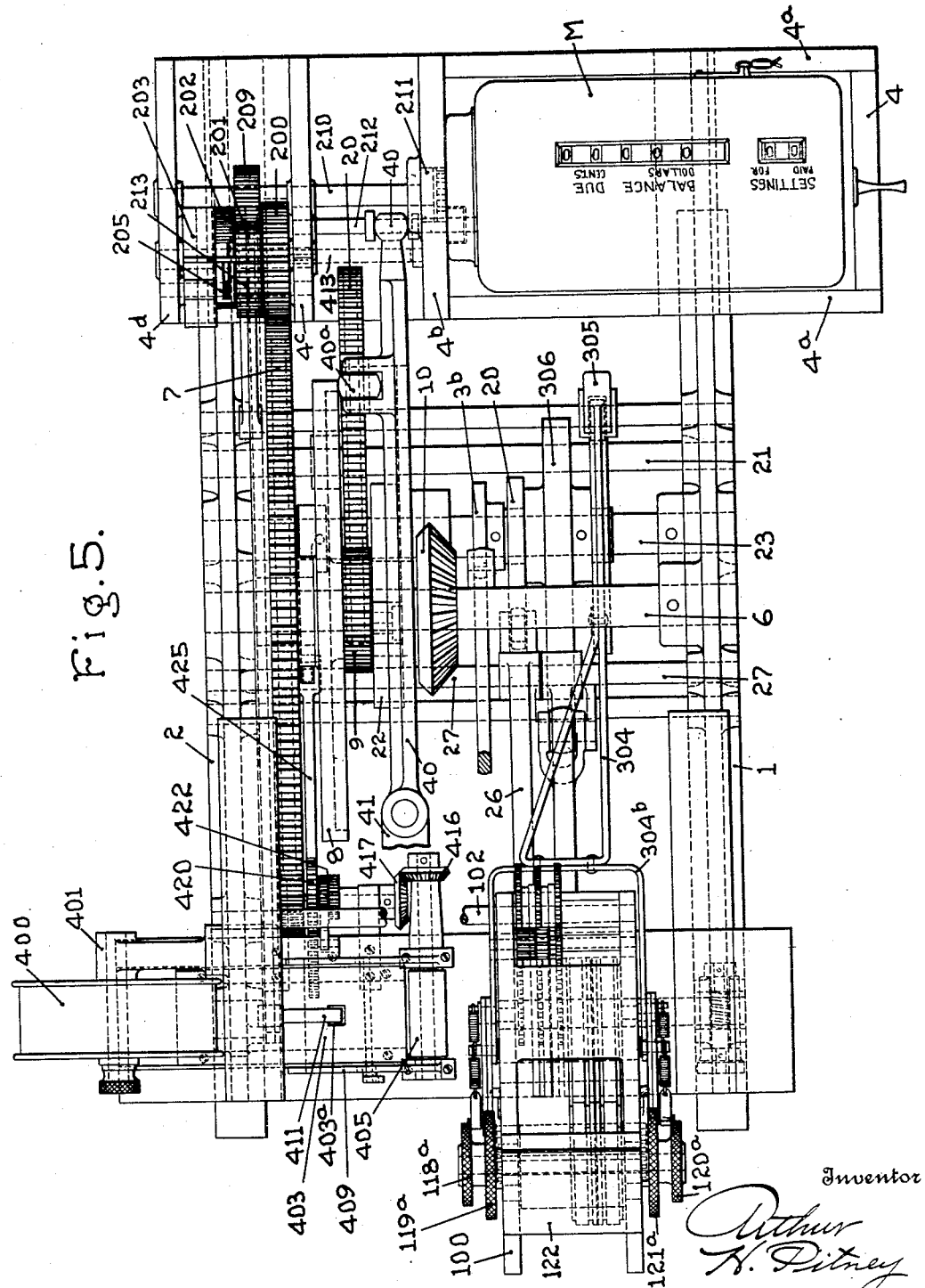

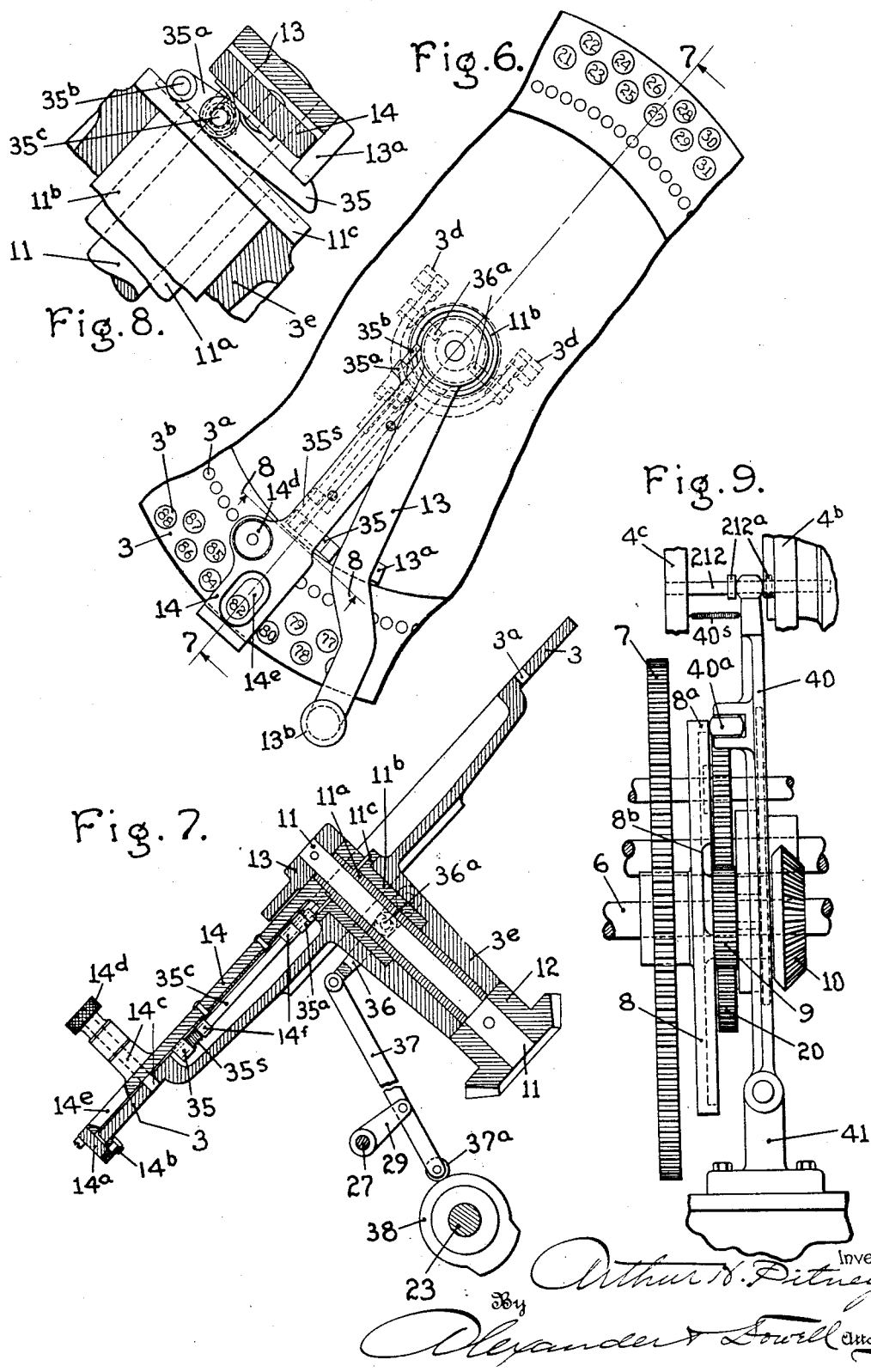

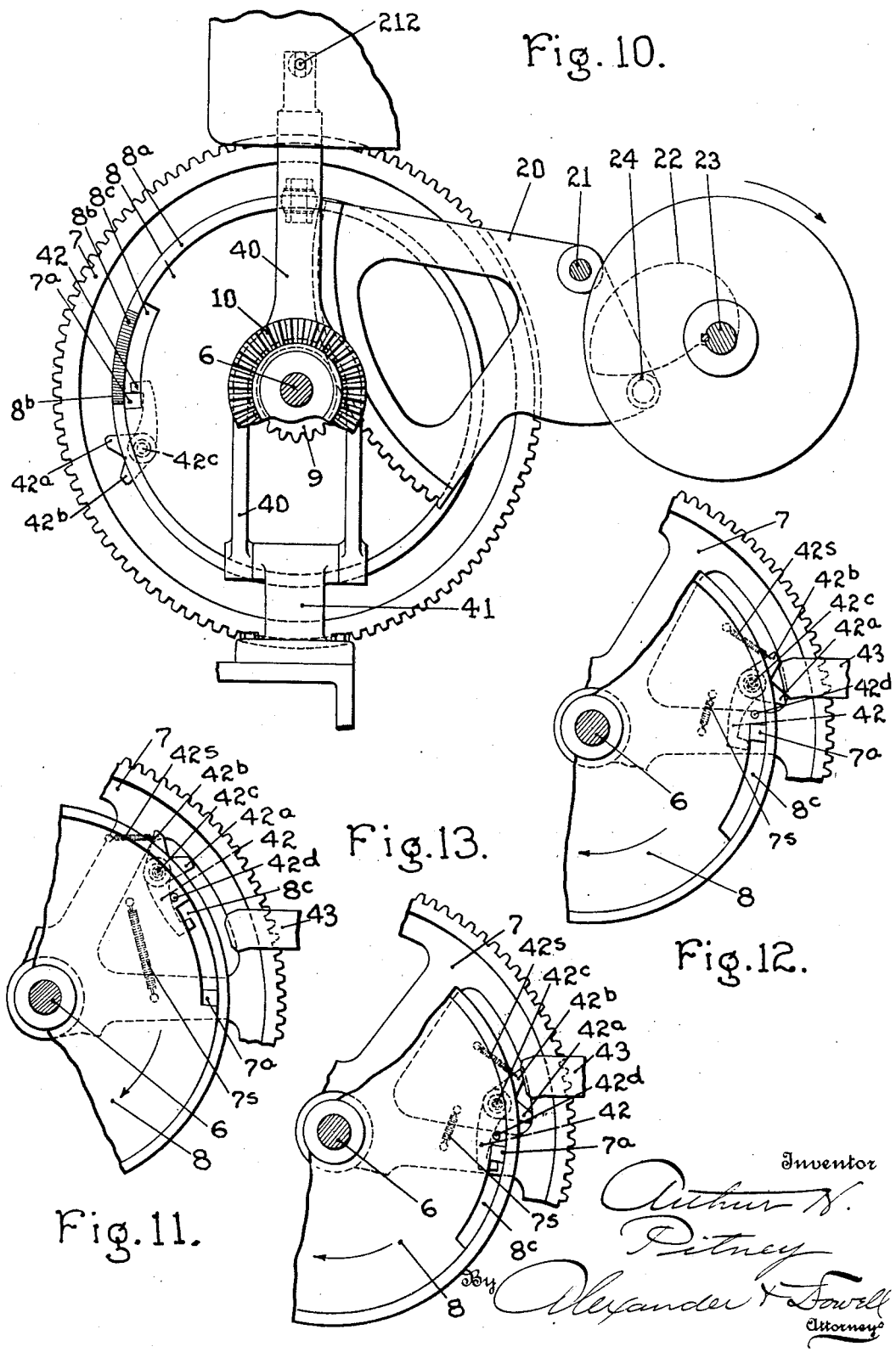

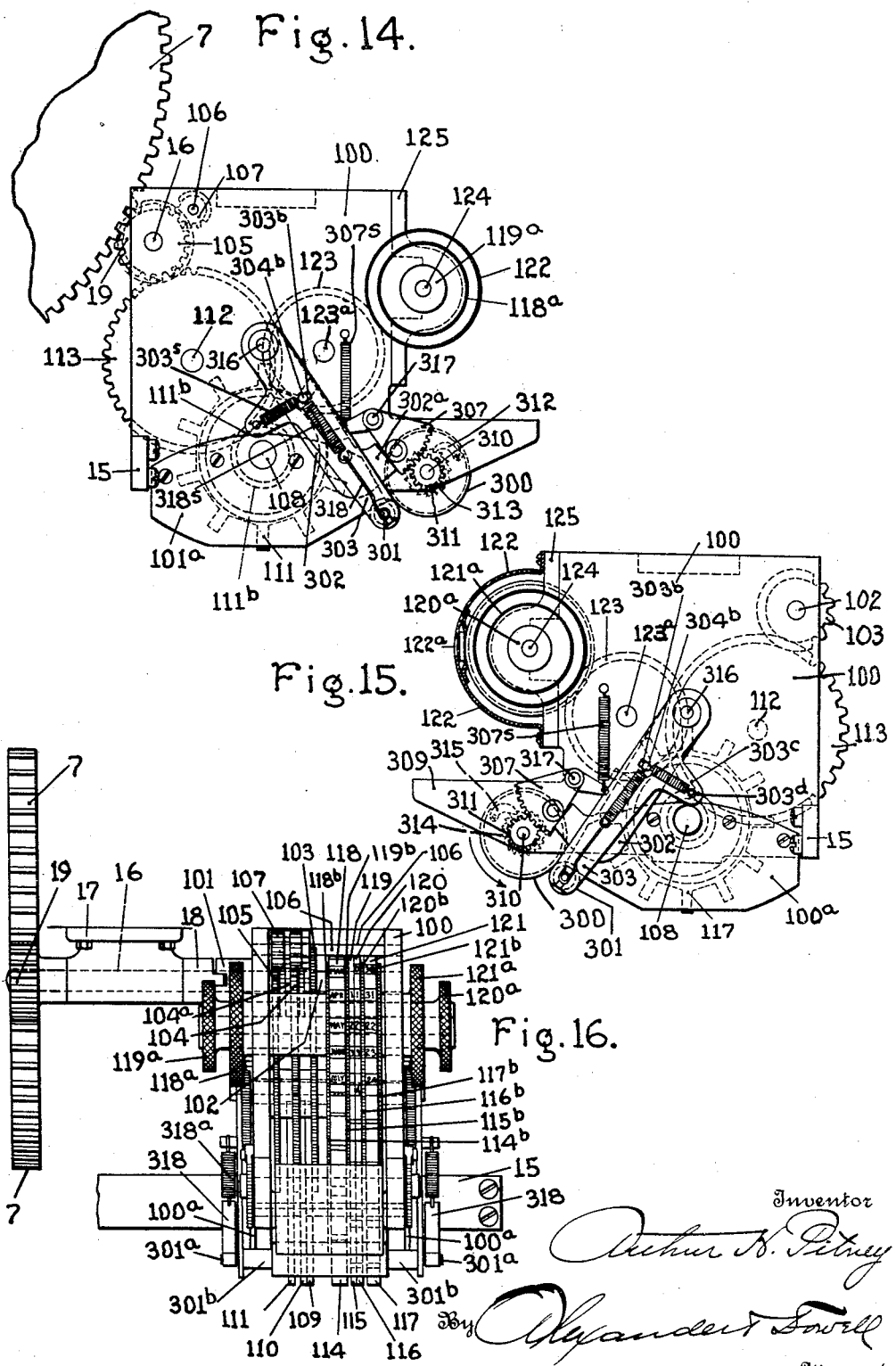

March 24, 1925.  1,530,852
A. H. PITNEY
PRINTING MECHANISM FOR PARCEL POST POSTAGE METER MACHINES
Filed Jan. 8, 1923   13 Sheets-Sheet 8
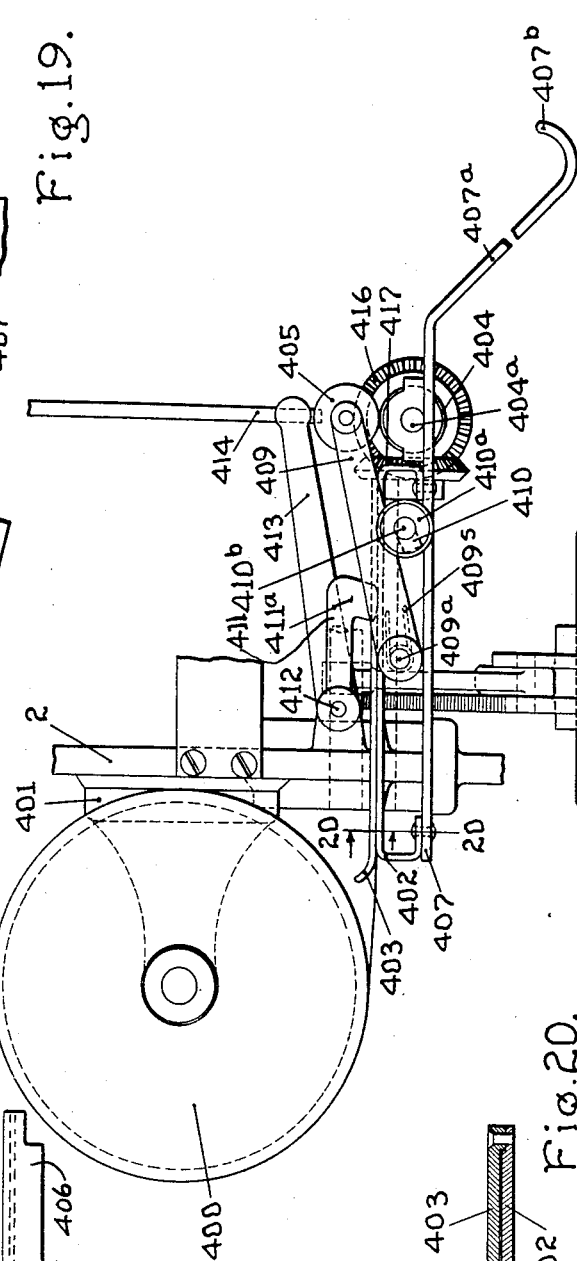

March 24, 1925.
A. H. PITNEY
1,530,852
PRINTING MECHANISM FOR PARCEL POST POSTAGE METER MACHINES
Filed Jan. 8, 1923     13 Sheets-Sheet 9
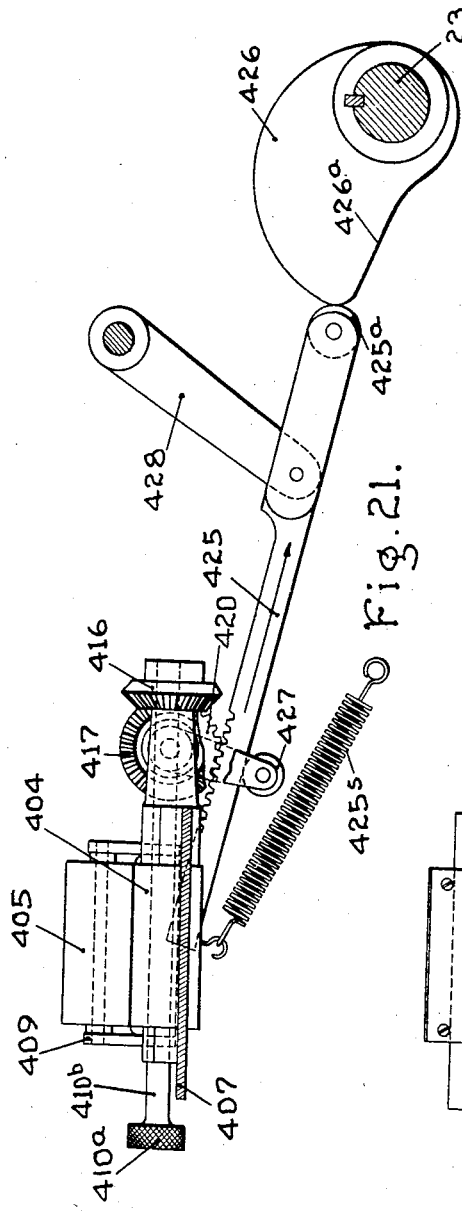
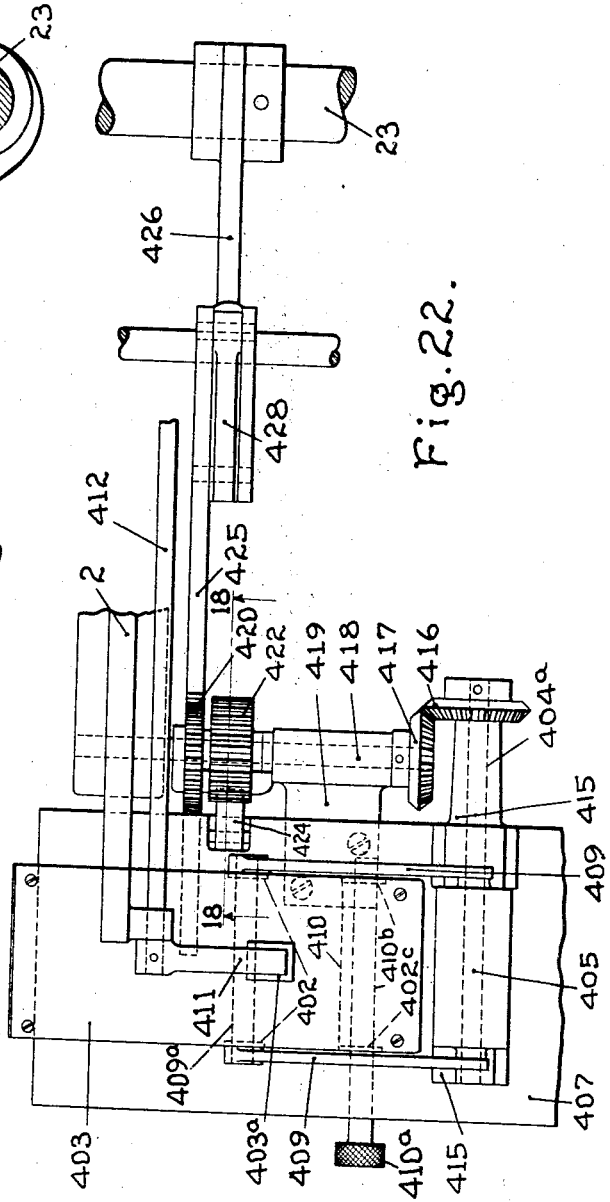

March 24, 1925.
A. H. PITNEY
1,530,852
PRINTING MECHANISM FOR PARCEL POST POSTAGE METER MACHINES
Filed Jan. 8, 1923  13 Sheets-Sheet 10
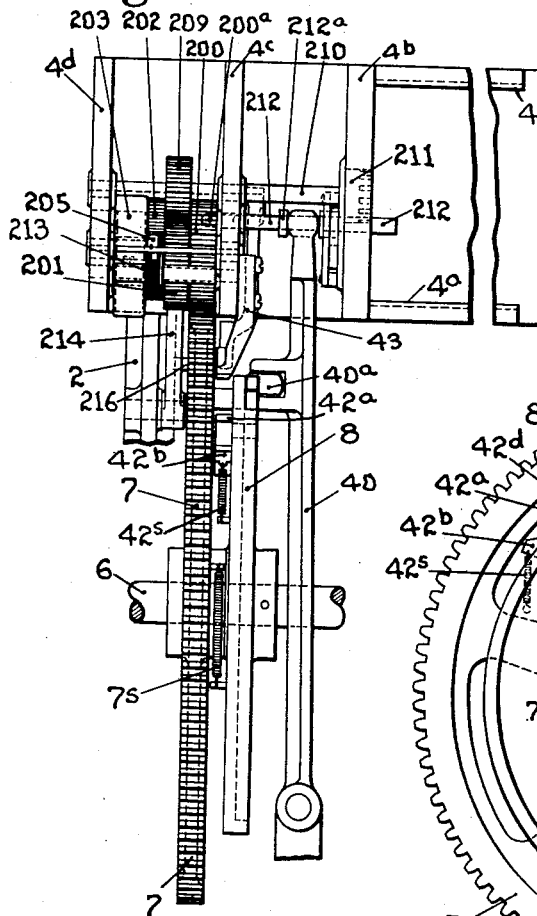
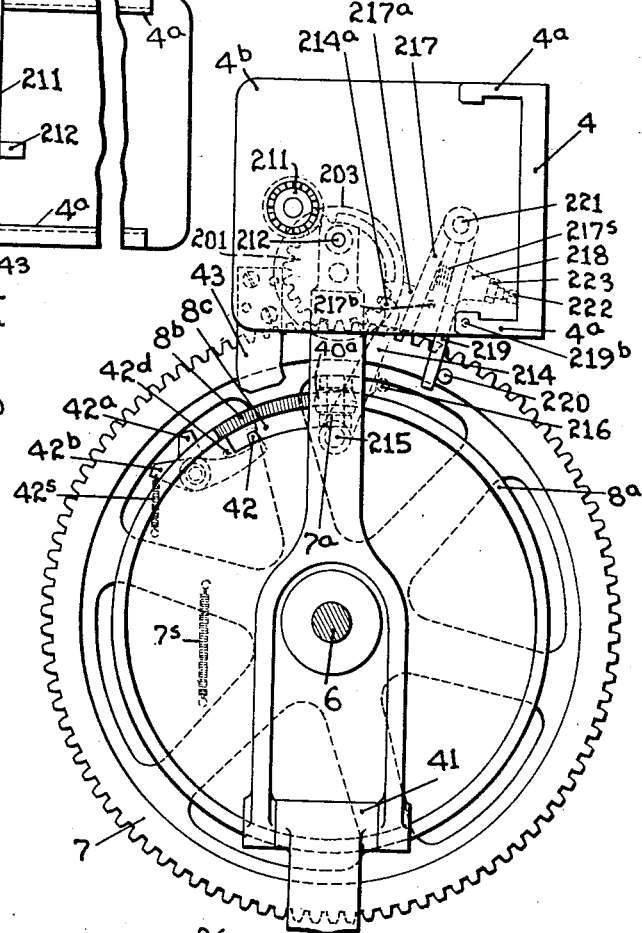
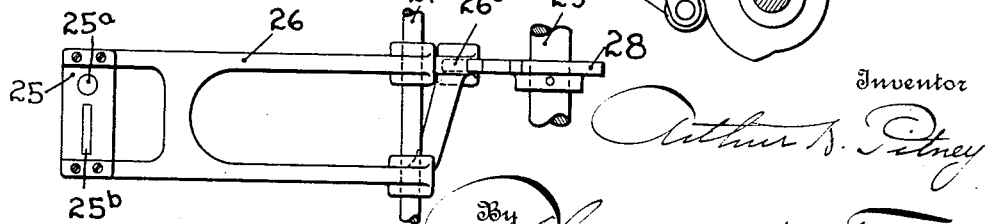
Inventor
Arthur H. Pitney
By Alexander H. Savel
Attorneys March 24, 1925.

A. H. PITNEY 1,530,852

PRINTING MECHANISM FOR PARCEL POST POSTAGE METER MACHINES

Filed Jan. 8, 1923

Inventor
Arthur H. Pitney
By Alexander & Dowell
Attorneys

March 24, 1925.
A. H. PITNEY
1,530,852
PRINTING MECHANISM FOR PARCEL POST POSTAGE METER MACHINES
Filed Jan. 8, 1923    13 Sheets-Sheet 12
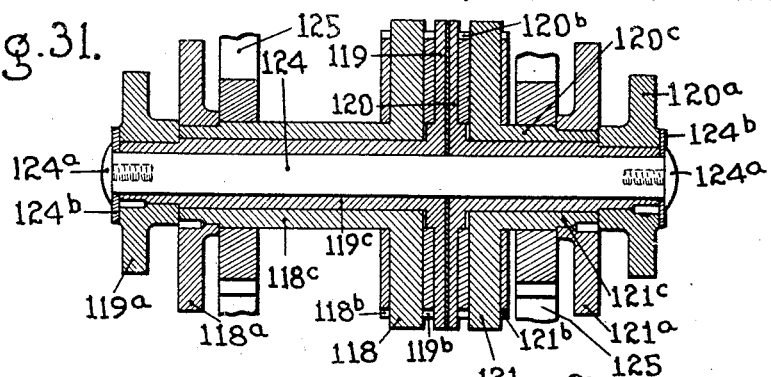
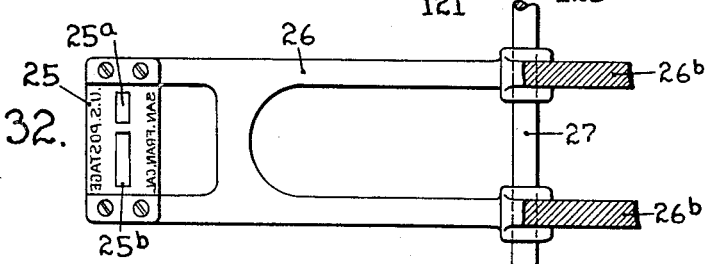
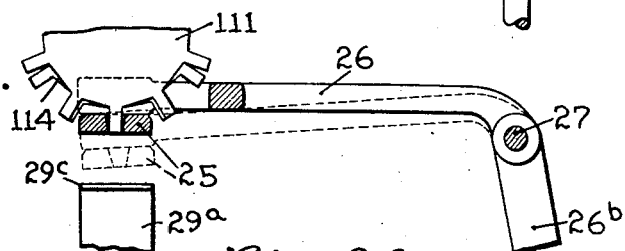
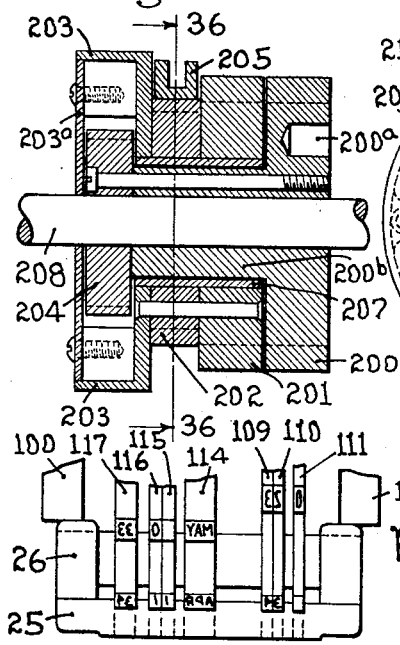
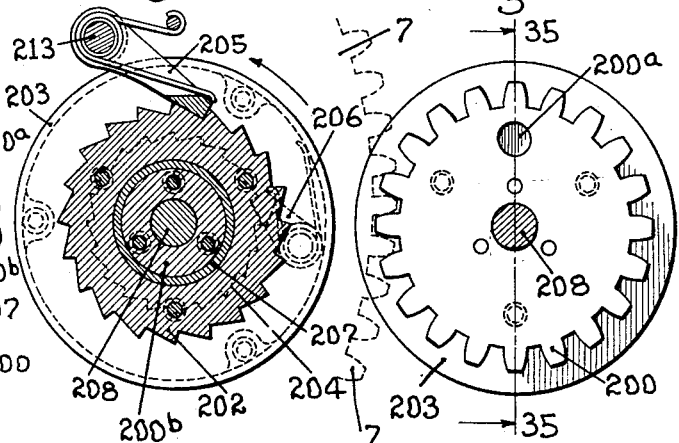
Inventor
Arthur H. Pitney
By Alexander & Dowell
Attorneys March 24, 1925.

A. H. PITNEY 1,530,852

PRINTING MECHANISM FOR PARCEL POST POSTAGE METER MACHINES

Filed Jan. 8, 1923  13 Sheets-Sheet 13

Inventor:
Arthur H. Pitney
By Alexander Lowell
Attorney.

Patented Mar. 24, 1925.

1,530,852

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

PRINTING MECHANISM FOR PARCEL-POST-POSTAGE METER MACHINES.

Application filed January 8, 1923. Serial No. 611,496.

*To all whom it may concern:*

Be it known that I, ARTHUR H. PITNEY, a citizen of the United States, residing at Stamford, in the county of Fairfield and State of Connecticut, have invented certain new and useful Improvements in Printing Mechanism for Parcel-Post-Postage Meter Machines; and I hereby declare that the following is a full, clear, and exact description thereof, reference being had to the accompanying drawings, which form part of this specification.

This invention is a novel machine particularly designed for printing any one of a number of stamps, tickets, or the like, of different denominations as desired. The invention is particularly adapted and designed for printing prepaid postage stamps for use on so-called permit mail matter. The machine shown is capable of printing stamps of any denomination ranging in amount from 1¢ up to and including $1.00, but the machine can be constructed to print a less or a greater variety of denominations of stamps, if so desired, that being merely a matter of design and size of the machine.

The invention is particularly adapted for use in the mailing of so-called parcel post matter, and while it can be adapted to print such stamp directly on the mail matter, the machine shown is constructed to print the stamps upon a gummed tape, which stamps are detached and applied to the mail matter like ordinary stamps.

The machine is not only designed to print stamps of any desired denomination as the same may be wanted for use, but also to register the total monetary value or amount of stamps printed by means of a registering mechanism so connected with the machine that each and every stamp printed, no matter what its denomination, will have the amount thereof registered by a suitable counter. The registering mechanism forms the subject matter of a companion divisional application (case #7,067) prepared in accordance with the official requirement for division of this case.

The machine is also designed to be used in connection with a so-called "meter", which preferably may be detached from the machine for convenience in setting the meter; and this meter preferably contains the registering mechanism. In such cases the machine and meter are so constructed in relation to each other that when the meter is removed from the machine the latter will be rendered inoperative; and when the meter is replaced in the machine the latter can be operated until the amount of prepaid postage which has been purchased is practically exhausted. The amount of the "prepaid" postage is "set" by a post office official on a counter in the meter, when the latter is removed from the machine; and then when the meter is replaced in the machine the latter can be operated to print any desired stamp or stamps until the postage paid for is exhausted. Means are provided whereby for each effective operation of the machine the value of the stamp printed is registered in the meter, and when the amount of prepaid postage is exhausted mechanisms are automatically tripped or actuated whereby the meter will not register further, and the machine cannot be again effectively operated to print a stamp, until the meter is reset for an additional amount of prepaid postage and replaced in the machine.

The present invention is particularly adapted for use in connection with the "postage meter" machines, shown and described in my Patent #1,370,668, dated March 8, 1921, which machines are now used for mailing prepaid first class mail matter. Such postage meters are adapted for handling mail matter in large quantities, but it frequently happens in commercial use that matter has to be mailed for which the value of the stamp made or indicated by the "postage meter" machine is not sufficient to cover the necessary amount of prepaid postage. Under such circumstances where the user does not have sufficient mail of heavier weight to justify the rental of a multiplicity of "meters" of various denominations of stamps to meet all of his mail requirements, the postal laws and regulations permit the affixing of additional adhesive stamps to make up the necessary amount of postage due. The placing of additional stamps on an envelope bearing a prepaid permit postage stamp, not only consumes time, but makes it necessary for the mailer to continue to carry ordinary adhesive stamps in stock. The placing of ordinary additional adhesive stamps on "permit" postage also means extra work and delay at the post office, where it is necessary to obliterate or "smudge" the adhesive stamps by hand to prevent the reuse of such stamps. To avoid all these objections, one object of my present invention is to enable the large mailers to dispense with the necessity for using the present ordinary adhesive postage stamps entirely; to provide a machine which will supply all the "prepaid" postage requirements lacking in the present mechanisms used in the prepaid postage meter system; and at the same time will furnish the user with an accurate mechanical audit of all his expenditures for postage.

As stated, by means of the present machine a prepaid postage stamp of any desired denomination can be printed either upon the mail matter itself or on a gummed strip. In the latter case each stamp when printed will be severed from the strip and then can be applied to the envelope like an ordinary stamp, but such stamp bears all the necessary indicia required by the Post Office Department in stamps used in the so-called prepaid postage meter system, and mail matter stamped therewith has all the advantages of the permit prepaid first class postage.

When "precancelled" stamps were first authorized by the Post Office Department they were originally sold only in sheets of 100 stamps and the mailer was allowed to use them only in special cases, where the quantity of mail matter on which they were used was sufficient to justify the employment of one or more clerks in the post office to not only supervise the handling of such stamps and mail, but to sort and route the mail in pouches direct to the terminals, thereby saving a second handling at the post office. The Post Office Department is now encouraging the more general use of prepaid permit postage, by large mailers; and the use of my patented prepaid "postage meter" machines, above referred to; and such other machines as comply with the requirements of the department in the printing of stamps on first class mail matter.

My invention provides a thoroughly efficient machine which will print and register prepaid metered mail stamps of any value, from 1¢ up to and including $1.00, with all the essential marks of identity, including the date, meter number, permit number, and point of origin will not only meet all the requirements of the Post Office Department and the user, but will save the Government the expense of making and distributing of a proportionate number of ordinary adhesive stamps; and save the user the annoyance and risks incident to having to carry a stock of ordinary stamps, and of having his mail delayed.

The printed indicia of a postage meter on gummed tape, would also eliminate the annoyance and possibility of dishonesty attending the use of "precancelled" stamps, now used by some large mailers, in order to facilitate despatch of their packaged mail upon reaching the post office, by saving the time otherwise necessary to cancel the stamps by hand.

The stamps printed by the machine contain all the essential requirements of both a postage stamp and a precancelled stamp, namely, the amount paid, the point of origin, the date, the user's permit number, and the number of the meter and machine on which it was printed. The amount, and the date, can be set by the operator, and the meter or register safeguards the account.

To enable others to understand and use the invention I will explain one practical embodiment thereof, as illustrated in the accompanying drawings; but I do not consider the invention limited to the specific construction or arrangement of mechanisms shown and disclosed in the drawings, and therefore refer to the appended claims for summaries of the essentials of the invention, and the various novel combinations, and various novel features, for all of which protection is desired.

In said drawings:

Fig. 1 is a front elevation of the complete machine, some small parts being omitted for the purpose of clearness.

Fig. 2 is a side elevation of Fig. 1.

Fig. 5 is a plan view of the mechanism shown in Fig. 3, with the dial actuating mechanism removed to more clearly show the underlying parts.

Fig. 6 is a top plan view of the dial, partly broken away, showing the locating and indexing arms.

Fig. 7 is a longitudinal section on the line 7—7 Fig. 6.

Fig. 8 is an enlarged detail section on line 8—8 Fig. 6.

Fig. 9 is a detail view of the devices for operating the meter pin.

Fig. 10 is a detail view of the devices for operating gear 7 and cam 8.

Figs. 11, 12, and 13 are detail views showing different relative positions of the indexing gear 7 and actuating cam 8.

Fig. 14 is a detail end view of the mechanism for operating the registering wheels and inking devices.

Fig. 15 is an opposite end view of the parts shown in Fig. 14.

Fig. 16 is a front view of Fig. 14, showing the actuating devices.

Fig. 17 is an enlarged detail view of the mechanism for feeding the gummed strip.

Fig. 18 is a sectional view of the ratchet devices on the line 18—18, Fig. 22.

Fig. 19 is a longitudinal sectional view on the line 19—19 Fig. 18.

Fig. 20 is a detail transverse section through the guide plates 402, 403.

Fig. 21 is an enlarged detail view of the mechanism for feeding the strip.

Fig. 22 is a plan view of the devices shown in Fig. 21.

Fig. 23 is an enlarged detail plan view of the mechanism for oscillating the meter pin; and actuating the meter devices.

Fig. 24 is a front view of Fig. 23.

Fig. 25 is a detail view of the die carrying lever and its actuating devices.

Fig. 26 is a top plan view of Fig. 25.

Figure 27:
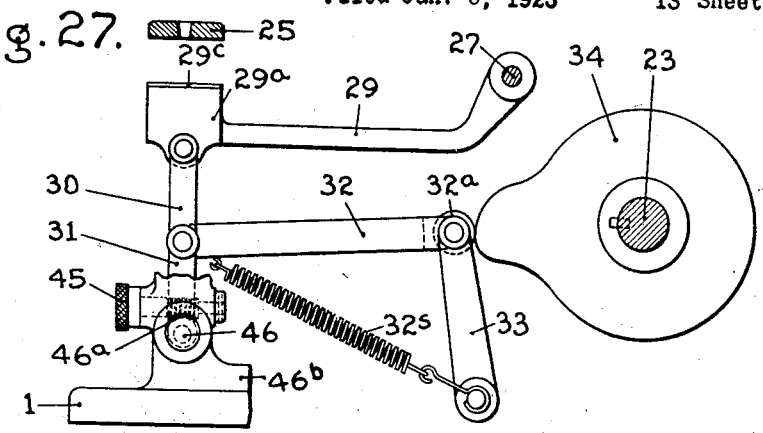

Fig. 27 is a detail view of the mechanism for operating the platen which cooperates with the die to make an impression on the strip.

Figure 28:
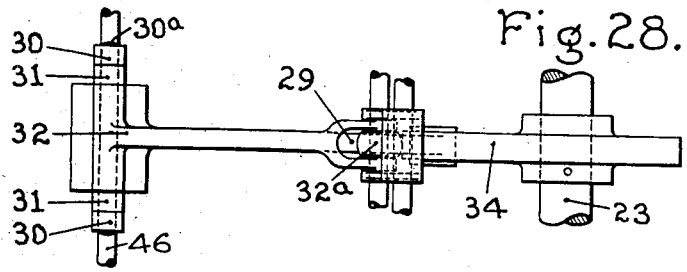

Fig. 28 is a detail plan view of devices shown in Fig. 27.

Figure 29:
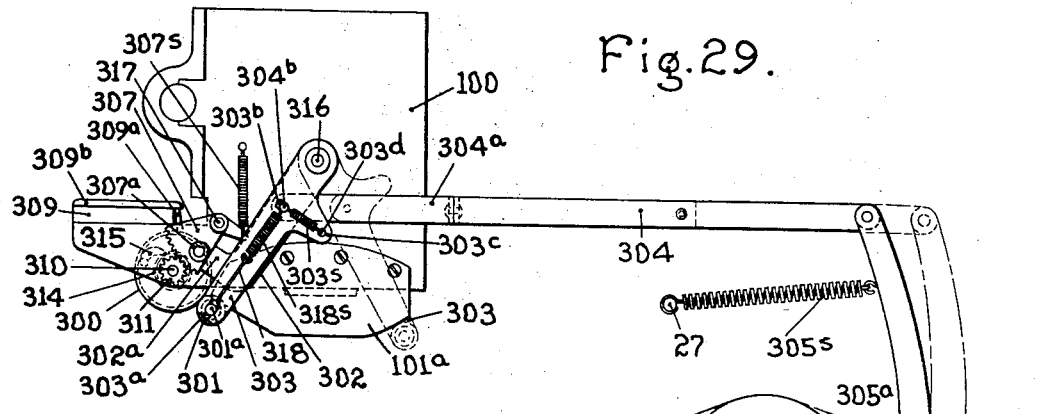

Fig. 29 is a side view of the inking devices and means for operating same.

Figure 30:
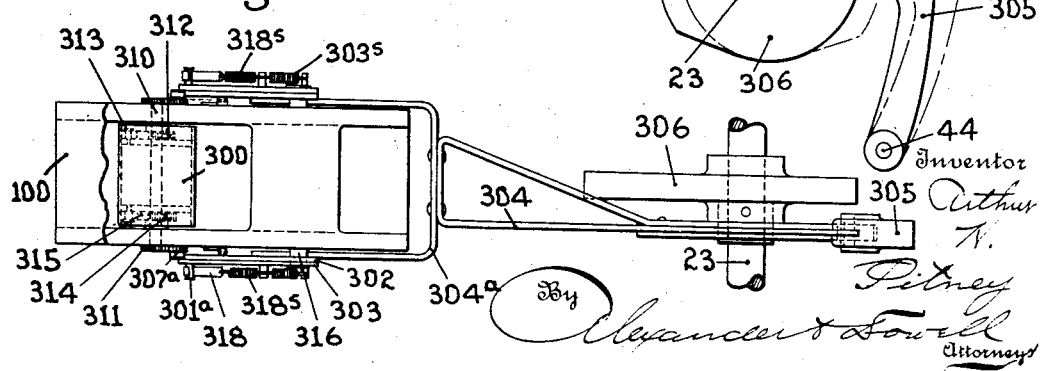

Fig. 30 is a top plan view of the devices shown in Fig. 29.

Fig. 31 is a longitudinal sectional view of the means for setting the dating wheels.

Fig. 32 is a detail plan view of the die and devices for carrying same.

Fig. 33 is a detail view of the parts shown in Fig. 32, also showing the die in locked position with the printing wheels ready for printing operation in full lines; and showing in dotted lines the die disengaged from the printing wheels.

Fig. 34 is an end view of part of the devices for operating the meter from the gear 7.

Fig. 35 is a sectional view on line 35—35 Fig. 34.

Fig. 36 is a sectional view on the line 36—36 Fig. 35.

Fig. 37 is a detail end view of Fig. 33 showing how the date printing wheels and numeral printing wheels are engaged and locked with the die 25.

Figure 38:
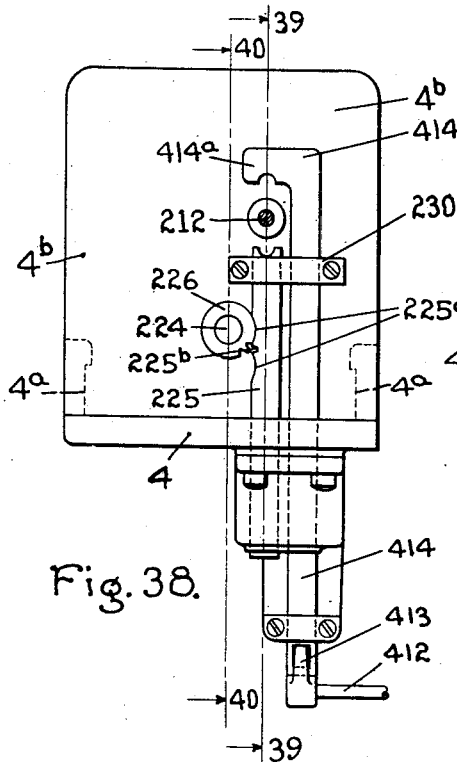

Fig. 38 is a detail view of the meter-pin locking devices.

Figure 39:
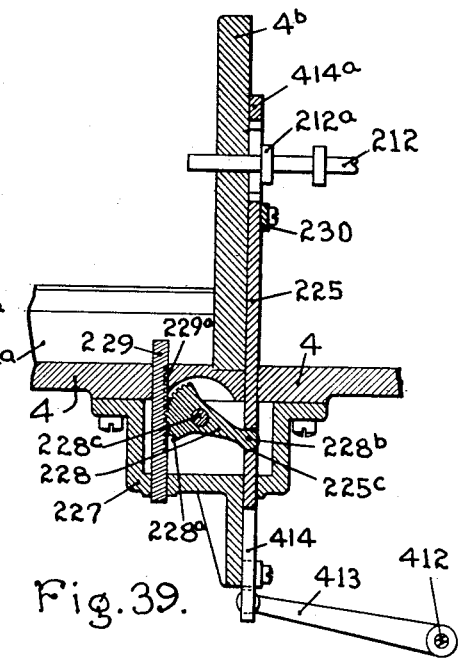

Fig. 39 is a sectional view on the line 39—39 Fig. 38.

Figure 40:
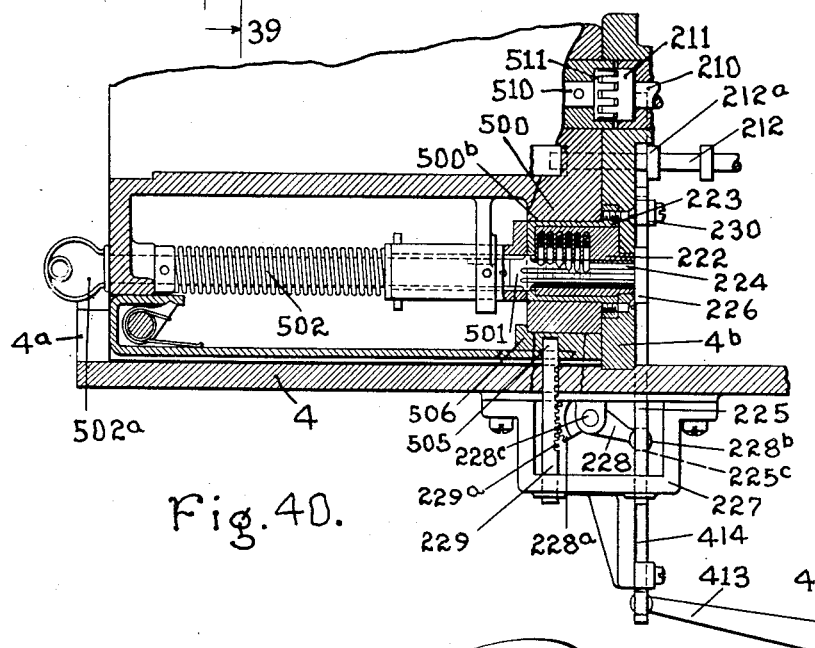

Fig. 40 is a longitudinal sectional view of the meter locking devices on line 40—40 Fig. 38.

The machine illustrated is for printing postage stamps to be attached to packages to be sent by "parcel post." Also internal revenue stamps commonly used for denoting the amount of tax paid on proprietary medicines, toilet articles, tobacco, playing cards, etc., but for which no adequate system of accounting has heretofore been devised. Documentary revenue stamps for stock certificates, promissory notes, checks, receipts, etc., could also be printed in the same way, or, if preferred, the stamps of proper denomination could be printed directly upon the document itself, thereby saving the necessity of affixing a separate stamp.

The machine shown comprises, in brief: (1) a dial upon the rim of which are visibly marked a series of numbers from 1 to 100, for the purpose of selecting the denomination of the stamp; (2) an indexing gear wheel, actuated by an arm on the dial, which communicates the movement of the dial arm to both the figure printing wheels and the meter; (3) a member containing the figure, and date printing wheels, the indicator for setting the date wheels, and the inking mechanism; (4) a die member and impression member; (5) a member containing the meter operating mechanism; (6) a feeding and cutting mechanism for the gummed tape; (7) a shaft provided with a crank and a series of cams to drive all the various mechanisms, (except the indexing) in harmony with each other; (8) a removable meter which contains registering and setting devices, and which may be removed from the machine for setting and replaced therein; and (9) means which when the meter is removed from the machine will prevent effective operation of the machine, and when the meter is in the machine will permit the machine to be operated until the amount of prepaid postage for which the machine was "set" is exhausted; whereupon the meter and the machine will become automatically locked and rendered ineffective until the meter is removed and reset for a further amount of prepaid postage.

In my application (case No. 6,754) filed July 12, 1922, Serial No. 574,427, I have shown and described the meter which I prefer to use; and explained how such meter is "set", or charged, and how it locks itself, and the mechanism, with which it is employed against further operation when the amount of "prepaid" postage for which it was "set" has been exhausted.

All the working parts of the machine are mounted on or in a suitable framing as shown and hereinafter described. And all the working parts are suitably encased, as indicated in Figs. 1 and 2, in such a way as to prevent anyone tampering therewith, with or without malicious intent. The particular construction of the casing however is not a feature of the present invention and further explanation and illustration thereof is unnecessary.

*The dial, the locating lever, and the indexing lever.*

Figure 3:
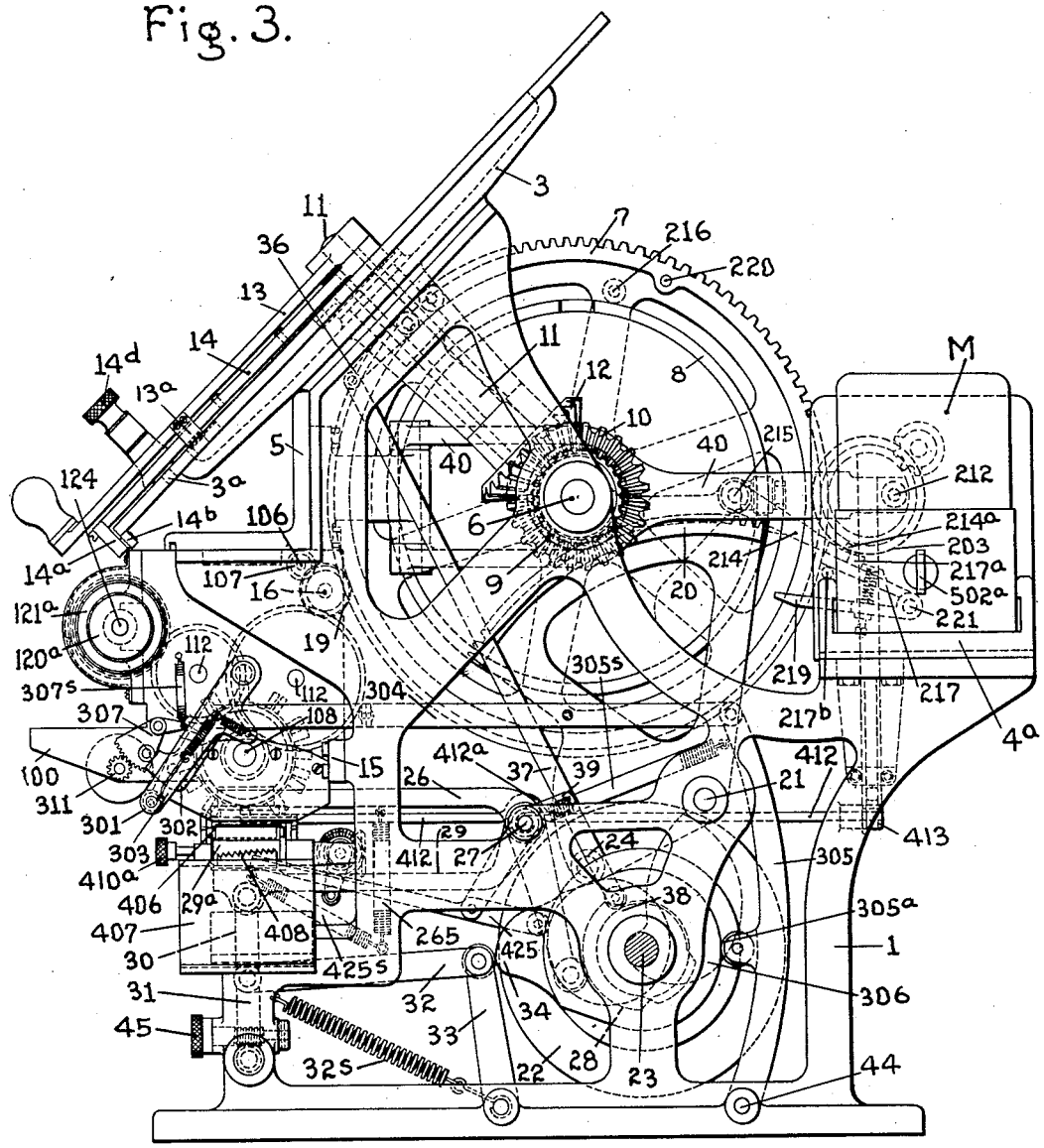
Fig. 3 is an enlarged side elevation of the complete machine with the cover or casing removed, the meter being in position.
Figure 4:
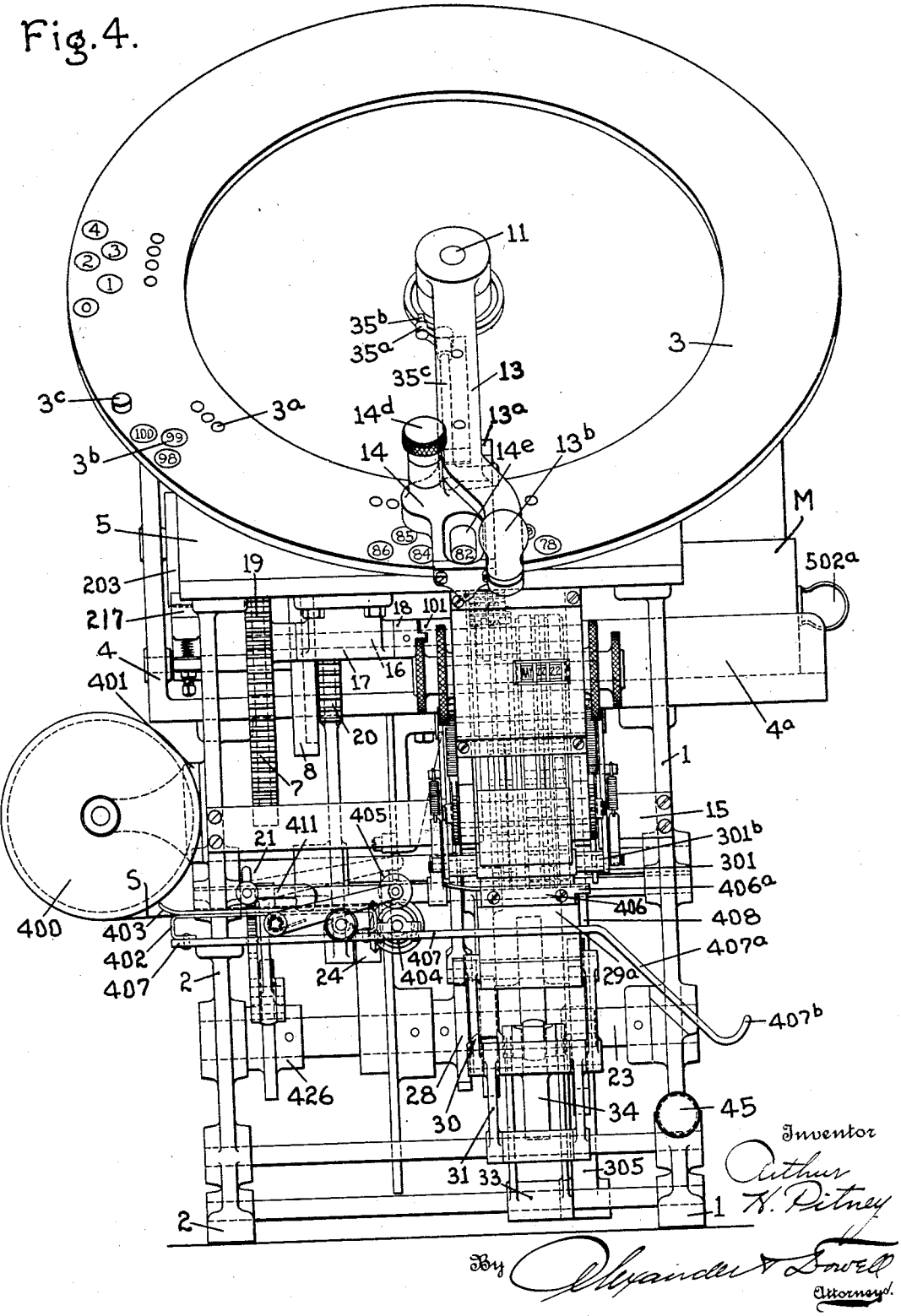
Fig. 4 is a front view of Fig. 5.

In the machine shown an index plate or dial 3 is fixedly attached to and mounted upon the upper side frames 1 and 2, Figs. 3 and 4. This dial preferably is a circular disk shaped casting and is set at an angle preferably inclined forward for convenience of the operator. In the machine shown the dial has 101 equally spaced holes $3^a$ drilled through its rim, all of which are equidistant from the center of the die; these holes are for the purpose of insuring accuracy in positioning the locating lever and arresting the index lever. The dial also has 101 panels $3^b$ positioned around its rim, one panel $3^b$ for each hole $3^a$. These panels are marked in legible figures with the numbers from 0 to 100, and are preferably sunken below the surface of the plate 3, to prevent any rubbing on the face of the dial effacing the characters.

The wide space in the dial between the holes representing zero and one hundred provides for the necessary movement of the interior operative mechanisms, hereinafter explained, before and after the actual operation of indexing.

The dial casting has an axial boss $3^e$ depending from its lower side (Figs. 3 and 7) and in this boss is journaled a spindle 11 to the upper end of which is attached a lever 13, which I term "index lever" and which projects beyond the rim of the dial and is provided with a handle $13^b$ by which it can be turned.

Surrounding the shaft 11 below the arm 13 is a sleeve $11^a$ to which is attached a radially disposed lever 14 which I term a "locating lever". This lever 14 is loosely pivoted on the shaft 11 and is used to prevent any improper oscillatory movement of the indexing lever 13. On the outer end of arm 14 is a plate $14^a$, carrying an anti-friction roller $14^b$, bearing on the under side of the rim of dial 3 and holding lever 14 in close contact with the face of the dial.

An indexing pin $14^c$, Fig. 7, with a knurled head $14^d$, is mounted on the arm 14, with a spring (not shown in drawing) normally forcing its inner end toward the plate 3. This pin $14^c$ can be engaged with any one of the holes $3^a$, to hold the arm 14 in any properly adjusted position. In the arm 14 is an opening $14^e$ just large enough to expose the related panel $3^b$ to view when the pin $14^c$ is engaged with its related hole $3^a$, so the correct number of that hole will appear in the opening $14^e$ (see Figs. 1, 4, 6).

On the underside of arm 14 are two downwardly projecting lugs $14^f$ (Fig. 7) through which passes a rod $35^c$ on the outer end of which is fastened a catch 35. A spring $35^s$ normally rocks the rod 35 so as to hold the catch 35 in its upward position ready to engage and hold the index lever 13.

The index lever 13 normally rests against a stop $3^c$ on the dial 3, at a point on the negative side of the zero hole of the dial. The lever 13 can be moved forward, clockwise, by means of its handle $13^b$ until the stop $13^a$ on lever 13 engages the edge of lever 14, which arrests it; the catch 35 engages the other side of the stop $13^a$ and prevents the lever 13 being moved backward until the printing is effected as hereinafter explained.

It will be necessary to release catch 35 and return arm 13 to its normal position before the cycle of operations of the machine are completed, so an automatic release on catch 35 is provided. A flanged sleeve $11^b$, Fig. 7, is slidably mounted on the bushing $11^a$. The top of the flange being counter bored to admit of a slight upward motion without interfering with the hub of the lever 14.

The upward motion is imparted to sleeve $11^b$, Figs. 7 and 5, through the forked lever 36, the link 37, and the cam 38. The forked lever 36 is pivoted in the lugs $3^d$ on the bottom side of the dial 3. The boss $3^e$ of disk 3 has elongated holes cut through it to admit the free passage of two pins $36^a$, of lever 36, Figs. 6, 7, which, passing through the boss $3^e$, engage two holes drilled in the sleeve $11^b$ for that purpose. To the free end of the forked lever 36, a link 37 is attached. A rocker arm 29 pivoted on the shaft 27 serves as a guide and support for the lower end of link 37; and a cam 38 is secured to the cam shaft 23, and engaging a roller $37^a$ on link 37 actuates the link.

To the inner end of $35^c$ is secured an arm $35^a$ which carries a pin $35^b$. The pin $35^b$, Fig. 7, of arm $35^a$ bears upon the flange $11^c$ of sleeve $11^b$ by reason of the spring $35^s$, mounted on the rod $35^c$, consequently an upward movement of sleeve $11^b$ will cause arm $35^a$ to turn the rod $35^c$ in its bearings in the lugs $14^f$ and also to rock the catch 35 downward, Fig. 8, thus releasing the index lever 13.

*The index gear operating devices.*

On the lower end of spindle 11 is mounted a beveled gear 12 which meshes with a bevel gear 10 on a shaft 6 journaled in the framing at right angles to spindle 11. On this shaft 6 is mounted a cam 8, and beside the cam a large indexing gear 7; motion being communicated to the gear 7 from the cam 8 by devices hereinafter described. When the index lever 13 is moved to turn spindle 11, the cam 8 will be moved and the gear 7 also correspondingly moved thereby, as hereinafter explained, so as to properly set the numeral printing wheels, and also properly actuate the registering mechanism as hereinafter explained. The construction being such that when the index gear 7 is turned by manually moving the index arm 13, the numeral type wheels of the printing mechanism will be so shifted that at the next printing operation they will print a number corresponding to the number on the dial appearing through the opening $14^e$ in the locating lever 14. When the index lever 13 is returned to zero position the numeral printing wheels will also be returned to zero position, as hereinafter described. Motion of the index gear 7 is also transmitted through suitable gearing to the meter, as hereinafter described, so that for each printing operation of the machine the counting or registering mechanism in the meter will be moved in exact accordance with the denomination of the stamp printed.

A spur gear 9 (Figs. 9-10) is secured to the shaft 6 beside the cam 8, the parts 6, 8, 9, and 10 moving as one piece. Cam 8 is moved in one direction by the manual operation of the indexing arm 13, as above described. The return movement of cam 8 is automatically accomplished by means of a gear segment 20 engaging gear 9, and operated by a cam 22 on shaft 23 (see Fig. 10). This shaft 23 makes one complete revolution in the direction of the arrow, Fig. 10, for each cycle of operations of the machine. At the beginning of an operation cam 22 is at rest in the position indicated in Fig. 10, and roller 24, on sector 20, is free to move downward along the edge of the cam, when the cam 8 is moved by the manual operation of the index lever 13, as above described.

The amount of upward movement of the toothed portion of the sector 20 depends upon the extent of movement of the index lever 13, or in other words on the denomination of the stamp to be printed. When the index lever 13 is held fast by catch 35, as described, the sector 20 will also be held fast until the catch is disengaged.

The shaft 23 in revolving carries the cam 22 out of contact with roller 24 of sector 20, and when it has made a half revolution the cam 38 (Fig. 7) which is also secured to shaft 23 raises the link 37 and releases the index lever 13, as above described; whereupon sector 20 is free to be moved in the reverse direction; and, as shaft 23 continues its revolution, the cam 22 will strike the roller 24 on sector 20 and force it back to its original position. This return movement of sector 20 will turn gear 9 back and cause the index lever 13 to move anti-clockwise back to zero. This return movement will be accomplished no matter at what part of its arc of movement the roller 24 or sector 20 may be in before the indexing lever is released.

A rocker arm 40 (Figs. 3, 5, 9, 10, 23, 24) pivoted in the bracket 41, and provided with a roller $40^a$, is hung directly in front of face cam 8 and carries a roller $40^a$ which is pressed against the cam surface $8^a$ by a spring $40^s$ connected to the arm. The cam surface $8^a$ has a depression $8^b$ which allows the arm 40 to oscillate when the roller $40^a$ enters such depressions as cam 8 is revolved.

The arm 40 is forked adjacent its pivot end to straddle the hub of the miter gear 10; and its free end is forked to straddle the "meter pin" 212 between the shoulders or collars $212^a$; so that the oscillation of the arm 40 will cause the meter pin to oscillate in the direction of its axis, as hereinafter described.

The oscillations of the meter pin 212 are essential to the proper functioning of both the printer and its meter. In the printer its function is to lock the indexing gear 7 at the zero point. This is accomplished by causing the inner end of the meter pin 212 to enter a hole $200^a$, Fig. 35, in one of the transmission gears 200 which meshes with gear 7.

The depression $8^b$ of the cam face $8^a$ is placed so as to register with the roller $40^a$ on the arm 40 when the index lever 13 is between zero and the stop $3^c$ on the dial. The indexing gear 7 is therefore locked when the machine is at rest, and remains locked until the index lever has been advanced clockwise to some significant figure on the dial.

The index gear 7 is loosely mounted on the shaft 6, but is moved by the operation of the cam 8. For this purpose cam 8 is provided with an arc shaped slot, and on gear 7 is a pin $7^a$ (Figs. 10-13) which projects into the slot $8^c$. The pin and slot will permit a slight relative movement of the cam 8 and gear 7, if the pin is free to move in the slot.

A spring $7^s$ connected to cam 8 and gear 7 normally pulls the gear 7 in the direction which would cause the pin $7^a$ to travel to the end of the hole $8^c$ nearest the catch 42. It cannot take up that position however, if and when it is locked in another (the zero) position, by reason of the entry of the "meter pin" 212 into the hole $200^a$ of the transmission gear 200 (Fig. 23) as hereinafter described.

The pin $7^a$ may be blocked in the slot, so as to prevent relative movement of the gear 7 and cam 8, by means of a catch 42 pivoted at 42ᶜ on the side of the cam 8 adjacent the gear 7; said catch being normally urged by a spring 42ˢ to engage the pin 7ᵃ of the gear when the latter is in the adjacent end of the slot 8ᶜ. The catch 42 has two arms 42ᵃ, and 42ᵇ on its rear end (Figs. 10–12, 23, 24) which are adapted to successively engage with the beveled end of bar 43 fastened to an adjacent stationary part of the frame in position to be successively engaged by the arms 42ᵃ, 42ᵇ, as the cam 8 rotates.

When the cam 8 is advanced by manually moving the index lever 13 as described, the slot 8ᶜ will (Fig. 11) move by the pin 7ᵃ, and the bifurcation 42ᵃ contacting with the trip bar 43 (Figs. 12, 23, and 24) is forced inward thereby rocking the hook 42 clear of the pin 7ᵃ. At the moment the hook clears the pin 7ᵃ the arm 42ᵃ clears the trip bar 43, and the second arm 42ᵇ engages the trip bar 43 and rocks the catch 42 back across the slot 8ᶜ, and the catch then holds pin 7ᵃ tightly against the adjacent end of the slot. During this movement of cam 8 (Fig. 24) the depression 8ᵇ of the cam is moved from its position opposite roller 40ᵃ and said roller 40ᵃ is forced out of depression 8ᵇ, thereby rocking the arm 40, and causing it to move the meter pin 212 out of the hole 200ᵃ of gear 200, releasing the gears, Figs. 9 and 10. This release takes place just as or an instant before the pin 7ᵃ is engaged by the end wall of the slot 8ᶜ. Then while the pin 7ᵃ is locked in the end of slot 8ᶜ by hook 42 (Fig. 13), the gear 7 and cam 8 will move as one piece.

The spring 7ˢ will urge and hold the gear 7 in the right direction with relation to the cam 8, at the moment when the gear 7 is neither held locked by the engagement of the meter pin 212 with gear 200; nor being driven by the locking of pin 7ᵃ to cam 8.

*The denomination printing wheels.*

The printing wheels (Figs. 14, 16) are mounted in a frame 100 secured to an angle piece 5 and a bar 15, fastened to the side frames 1 and 2. A horizontal shaft 102 is mounted in the frame 100 near the upper rear corner thereof, and is provided with a coupling 101 on one end (Fig. 16) which engages a coupling 18 on the adjacent end of a spindle 16 journaled in a bracket 17, secured to the under side of the angle piece 5. Spindle 16 carries a gear 19 which meshes with the index gear 7. Shafts 16 and 102 are virtually one shaft; the couplings 18, 101, being used for convenience in assembling the parts.

Within the frame 100 and securely fastened to shaft 102 is a wheel 103, which is composed of a 20-tooth spur gear, and a 2 tooth intermittent gear fastened together as one piece, the spur on the right and the intermittent on the left hand. Loosely mounted on shaft 102 to the left of gear 103 is a similar wheel 104, consisting of a 20-tooth spur and a 2-tooth intermittent gear. Immediately to the left of gear 104, and loosely mounted on shaft 102, is a 20-tooth spur wheel 105.

A short distance above and in front of shaft 102, and parallel with it, is shaft 106. Mounted loosely on this shaft 106 are two pinions 107. Each of these pinions preferably has ten teeth, and at one end of each pinion every alternate tooth is milled away for a short distance converting that end of each pinion into an intermittent follower gear with 5 stops. (The pinions 107 do not necessarily have ten teeth; pinions with eight teeth and four stops will answer the same purpose.) These pinions 107 are so placed that their intermittent follower ends will be driven by the intermittent portions of wheels 103 and 104, and the spur ends of pinions 107 will be meshed with the spur portions of wheels 104 and 105. Such intermittent gearing is not a feature of the present invention. It is a modification of the well known "Geneva stop" movement, and is preferably used in order to intermittently transmit motion from the first wheel 103 to the second wheel 104; and from wheel 104 to wheel 105. One revolution of wheel 103 will move wheel 104 $\frac{1}{10}$ of a revolution; and one revolution of wheel 104 will move wheel 105 $\frac{1}{10}$ of a revolution. The three wheels 103, 104, 105 will be advanced by the motion imparted to gear 103 by the index gear 7, substantially as described in my companion application case #6,754, filed July 12, 1922, Serial No. 574,427.

The gear 19 has only 10 teeth while gear 103 has 20 teeth. Therefore an advance of one tooth by gear 7 would cause gear 103 to advance two teeth or $\frac{1}{10}$ of a revolution, and correspondingly advance printing wheel 109 $\frac{1}{10}$ of a revolution.

In the frame 100 (Figs. 14–16) is also mounted a spindle 108 upon which are loosely mounted three numeral printing wheels 109, 110 and 111 which are provided with type figures, and are used in connection with the stamp die to print the value or denomination of the stamp printed by the die. As shown, each of these wheels has ten radially projecting type arms, equally spaced around its circumference; these arms respectively carry numeral type 0 to 9 in regular sequence. 109 is the units wheel; 110 the tens wheel; and 111 the hundreds wheel, of the stamp denomination printing wheels. Secured to each of the wheels 109, 110, 111, is a 20-tooth spur gear 111ᴮ which meshes with a spur gear 113 loosely mounted on a spindle 112 in casing 100. The respective gears 113 in turn mesh with the gears attached to the numeral wheels 103, 104, and 105, respectively, of the counter.

The numeral gears 103, 104 and 105 of the counter, and gears of the printing wheels 109, 110 and 111 contain the same number of teeth, and consequently type figures engraved on the arms of the printing wheels 109, 110, and 111 will be presented at the printing point, conformable to the number of teeth on the counter wheels advanced by the index gear.

The denomination number printing wheels 109, 110, 111, are automatically shifted in accordance with the position of the setting lever 14 upon the movement of the indexing arm 13 from zero position up to and against the setting lever, so that the numbers presented by the printing wheels at the printing point will correspond with the number on the dial seen through the opening 14$^e$ in the setting lever 14.

*The date printing wheels.*

Four date printing wheels (114, 115, 116, and 117) are also loosely mounted on shaft 108 adjacent the denomination printing wheels (109, 110, 111). Each of the date printing wheels have twelve radially projecting arms around its circumference. The arms of wheel 114 are engraved Jan. Feb. Mar., etc., representing the 12 months. The arms of wheel 115 are engraved, 1, 2, 3, blank, 1, 2, 3, blank, etc. The twelve arms of wheel 116 are engraved from 0 to 9 with two blanks; and the arms of wheels 117 are engraved with a series of numbers representing years A. D. Each of the dating wheels has secured to it a spur gear 114$^b$, 115$^b$, 116$^b$, and 117$^b$ to enable it to be turned by the date wheel setting devices, as hereinafter described.

Near the front of frame 100 (Figs. 14–16) are four "date" wheels (118, 119, 120, and 121) mounted to turn loosely on a shaft 124 (Fig. 31). These date wheels are covered by a sheet metal case 122 (Fig. 15) fastened to the frame 100, and having a sight opening 122$^a$. Each of the wheels 118, 119, 120, and 121 is engraved with the same characters as its related date printing wheel (114, 115, 116, and 117); which characters can be read at the sight opening 122$^a$. Each wheel 118, 119, 120, 121 (Fig. 17) has fastened to its sides a spur gear (118$^b$, 119$^b$, 120$^b$ and 121$^b$) by which motion may be transmitted to its corresponding date printing wheel (114, 115, 116, and 117) through intermediate gears 123 mounted on a spindle 123$^a$ in the casing 100.

As shown (Fig. 31) wheel 118 is provided with a long hub or sleeve 118$^c$ to the outer end of which a knurled knob 118$^a$ is secured and the gear 118$^b$ is also fastened to wheel 118. Wheel 119 is similarly provided with a sleeve 119$^c$, a gear 119$^b$, and a knurled knob 119$^a$. The parts 118, 118$^a$, and 118$^c$ as a unit turn freely on the sleeve 119$^c$ and must be assembled thereon before attaching the knob 119$^a$. The wheels 120 and 121 are similar in construction and mounting to wheels 119 and 118, as shown in Fig. 31. The shaft 124 passes through the bores of sleeves 119$^c$ and 120$^c$ and holds them in line, and is itself held in place by screws 124$^a$ and washers 124$^b$. Two cap plates 125 attached to the frame 100 support the sleeves 118$^c$ and 121$^c$ and the parts mounted thereon.

To set the date printing wheels it is only necessary to turn the related wheels 118, 119, 120 and 121 by means of their knobs 118$^a$, 119$^a$, 120$^a$ and 121$^a$, until the correct date appears at the sight opening 122$^a$ in case 122, the date printing wheels 114, 115, 116, and 117 being adjusted by and with the wheels 118, 119, 120, 121; so when the correct date is shown at the sight opening 122 the correct type for printing such date will be positioned by wheels 114, 115, 116, 117 at the printing point.

When the date printing wheels 114, 115, 116 have been properly adjusted to bring the desired date and number to the printing position, they remain in that position ready for operation at any time until the date is to be changed, which is manually effected as above described.

*The stamp die.*

When the machine is ready to make an operation, prior to the printing, the properly positioned type arms upon the date wheels and denominational wheels are engaged by a stamp die plate 25, (Figs. 32, 33) which die also carries on its own face any desired indicia, such as U. S. postage and the place of mailing, that it is desired shall appear upon the stamp.

As shown in Fig. 32 the die plate 25 has a slot 25$^a$ to receive the numeral arms of the denomination printing wheels, and a slot 25$^b$ to receive the numeral arms of the date printing wheels. The die plate is secured to one end of an oscillating lever 26 which is pivoted on the shaft 27, and is caused to oscillate at the proper times by a cam 28 fastened to the cam shaft 23. Lever 26 has a roller 26$^a$ (Figs. 25–26) on its lower end 26$^b$ held in engagement with said cam by a spring 26$^s$. Cam 28 makes one complete revolution to each printing operation.

In the raised position of the die 25 (Fig. 33) the type faces of the arms of all the printing wheels (109, 110, 111, 114, 115, 116, 117) are entered in the slots 25$^a$ and 25$^b$, and said type faces are in the same plane as engraved face of the die; and while in this position, and after inking, an impression is taken from the die and type arms of the dating and denominational wheels engaged therewith, by suitable means; preferably as hereinafter described.

While the parts are in the position shown in Fig. 33 the die 25 is inked by an ink roller 301 (Fig. 14) which is then moved across the face of the die, and immediately after the impression is taken the ink roller is returned to the position indicated in Figs. 14 and 15, and the die 25 is caused to take up the position shown in dotted lines in Fig. 33, disengaging the date and denominational printing wheels and allowing the denominational wheels to be turned back to zero by the return movement of indexing lever 13 and parts connected therewith.

The die 25 remains in this lowered position while the machine is idle and until the denominational printing wheels 109, 110, 111, have been reset for printing the next stamp. The wheels are returned to zero after every operation, so they must always be reset. None of the printing wheels can be revolved while the die is in its upper position, as the wheel arms are then engaged in the slots 25$^a$ and 25$^b$ of the die plate.

The impression is effected by a platen 29$^a$, which is mounted on a lever 29 (Figs. 3, 27, 28) pivoted on the shaft 27. The platen 29$^a$ is preferably provided with a rubber face 29$^c$ to insure good imprints. The platen is moved up and down at the proper times, by means of a toggle 30, 31 which is connected by a link 32 to a rock arm 33 carrying a roller 32$^a$, which is held in engagement with a cam 34 on shaft 23 by a spring 32$^s$.

To adjust the impression pressure the lower end of the toggle link 31 is pivoted to an eccentric pin on a shaft 46, mounted in a support 46$^b$. Shaft 46 can be turned in its bearings by a worm 45 on a rod passing through the support at right angles to the shaft (see Fig. 27) and engaging worm teeth 46$^a$ cut in shaft 46. Any other suitable means for adjusting the pressure of the impression arm against the die 25 can be used.

To die arm 29$^a$ is attached a metal guide 406 (Figs. 1–4), adapted to hold the gummed tape T in position during the printing, feeding, and cutting of the tape.

*Inking mechanism.*

The roller 301 is detachably mounted in the lower ends of vibratory arms 303 (Figs. 14, 15, 29) pivoted at 316 to the sides of the casing 100. Preferably the ends of the spindle 301$^a$ of roller 301 are entered in slots 303$^a$ in the lower ends of the arms 303 and detachably confined in the slots by hooks 318, attached to springs 318$^s$, and grooves may be turned in the spindle 301$^a$ to prevent the hooks 318 from slipping off; and spacing collars may be placed on the spindle 301$^a$ between the felt part of roller 301 and the arms 303, Fig. 15, if desired.

In its retracted position roller 301 contacts with an ink distributing roll 300 to which ink is supplied by a wick 307$^a$ from a fountain 309 mounted on the front side of frame 100 as indicated in the drawings. This fountain may be filled by removing its cover 309$^b$ and pouring in the required ink.

The levers 303 are swung back and forth by suitable devices at the proper time to move roller 301 across the face of the die preferably as hereinafter described.

The roll 300 is loosely mounted on a shaft 310 journaled in brackets on the sides of frame 100, and has on its outer ends spur gears 311. On one end of the shaft 310 (Figs. 30 and 15) is a ratchet wheel 312 which is engaged by a pawl 313 to the adjacent end of roller which is preferably recessed to enclose ratchet 312. Ratchet 312 and pawl 313 will cause roll 300 to turn in the direction of the arrow, Fig. 15, when shaft 310 is rotated in that direction.

At the opposite end of roll 300 (Figs. 30 and 14) is a ratchet wheel 314 engaged by a pawl 315 pivoted to the adjacent side of frame 100. The inclination of the teeth of ratchet wheel 314 is in opposition to those of ratchet 312, and serves to prevent the roll 300 from being turned when shaft 310 is rotated in the opposite direction. By the described means the reciprocal motions of the shaft 310 are converted into an intermittent direct motion of the roll 300.

A gear sector 307 is pivoted at 317 on casing 100 adjacent each end of shaft 310 and meshes with the pinions 311 on such shaft. These segments are rocked forward by arms 302, hereinafter referred to, and moved backward by spring 307$^s$; thus rotating the spindle 310 alternately forward and backward.

Pivoted on pins 316 beside levers 303 are arms 302 which are used to move the levers 303 and actuate sectors 307 to cause the positive rotation of the ink feed roller 300.

A U-shaped member 304$^a$ embraces the frame 100 and carries pins 304$^b$ which pass through holes in arms 302 and slots 303$^b$ in levers 303 (see Figs 14, 15, 29). To member 304$^a$ is secured one end of a bar 304, the other end of which is pivoted to the upper end of an arm 305 (Figs. 29–30) pivoted on a rod 44, and provided with a roller 305$^a$ which is held in engagement with a cam 306 on the cam shaft 23 by a spring 305$^s$.

The arms 302 and levers 303 are swung back and forth by the action of cam 306 and spring 305$^s$, as indicated in Fig. 29. Each arm 302 is provided near its lower end with a forwardly projecting lug 302$^a$ which is adapted to engage a roller 307$^a$ on the gear sector 307 and move it against the pull of its spring 307$^s$.

Plates 100ᵃ are attached to the frame 100, one at each side, and their lower edges are shaped to approximate the arc of travel of the roller 301. The collars 301ᵇ on spindle 301ᵃ ride on the bottom edges of these plates 100ᵃ and prevent roller 301 from improperly hitting the edges of the die 25. The roller 301 is revolved by frictional contact with the die 25 and the roller 300.

The slots 303ᵇ in links 303 through which the pins 304ᵃ pass allow levers 303 a limited movement on their pivots independently of the arms 302. Each lever 303 has a rearwardly projecting lug 303ᶜ to which is secured a stud 303ᵈ; and a spring 303ˢ (Fig. 1) connects the stud 303ᵈ with the adjacent pin 304ᵇ and tends to move the lever 303 as far forward with relation to the arm 302, as the length of the slot 303ᵇ will permit; and will hold same in such relative position until the lever 303 reaches the position shown by full lines in Fig. 29; the roller 301 then contacts the roller 300 which prevents any further forward movement of levers 303; but the arms 302 can continue their forward motion and their lug 302ᵃ encounters rollers 307ᵃ and rocks segments 307 causing roll 300 to be revolved, as described. The revolution of roll 300 will cause roller 301 when in contact therewith to revolve and distributes a small quantity of ink on its surface to be later applied thereby to the printing die 25. The movement of roll 300 under the wick 307ᵃ replenishes its own supply of ink; and as the roll 300 only rotates in one direction the roller 301 will always make contact with a freshly inked part of the surface of roller 301.

*Strip feed.*

The machine shown is particularly designed to print stamps upon a gummed strip of paper and means are provided for feeding said strip to and between the printing members, and for severing the stamp from the strip after it has been printed.

A shelf 407 is mounted on the front end of the machine, (Figs. 1 and 4) somewhat below the level of the upper face of the platen 29ᵃ, said shelf having an opening through which the impression member projects to make the impression. The right hand end 407ᵃ of this shelf is bent downward, and has its lower extremity 407ᵇ bent upward, the parts 407ᵃ and 407ᵇ forming a receiver for the printed stamp severed from the strip by the cutter 408.

Mounted on this plate 407—Figs. 17–22— is a positively actuated feed roller 404 attached to a shaft 404ᵃ journaled in bearings on the shelf 407, and driven as hereinafter described. This roller 404 is preferably rubber faced to more positively bite the tape. An upper coacting feed roller 405 is mounted in bearings on a swingable bracket 409, Fig. 17 and is normally pressed downward against roller 404 by a spring 409ˢ.

A reel 400 of gummed tape (Figs. 1, 4, 5, 17) is mounted in a holder 401 at the left hand side of the machine; and the strip S is led from reel 400 to and between the rollers 404 and 405, the strip being preferably directed thereto by guide plates 402 and 403. As shown the plate 402 has its ends turned down and supported upon and fastened to the shelf 407, as indicated in Fig. 17; and the plate 403 is supported on and fastened to the top of the plate 402, as indicated in Figs. 17, 20, and 22, the said plates being recessed or spaced apart sufficiently to permit the passage of the strip S and direct it to the feed rolls.

These guides 402, 403, not only serve to direct the strip to the rollers but also they form part of a detecting and locking mechanism by which the machine is automatically locked, if the strip S is broken or becomes exhausted, as hereinafter described.

Beneath the bracket 409 carrying the roll 405 is a cam 410 (Figs. 17, 21, 22) attached to a rod 410ᵇ having a knurled head 410ᵃ. By turning rod 410ᵇ the cam 410 lifts the bracket 409 and raises roller 405 out of contact with the roller 404, so that the strip can be easily threaded in the machine.

The roller brackets 409 and the rod 410ᵇ may be supported in lugs 402ᵇ and 402ᶜ formed by bending down projections on the sides of the lower guide plate 402.

The shaft 404ᵃ of feed roll 404 is journaled in bearings 415 on shelf 407 and carries a gear 416 (Figs. 17, 21, 22) meshing with a gear 417 on a driven shaft 418 journaled in a bracket 419 attached to the platform 407. To shaft 418 is secured a ratchet 422 (Figs. 18, 19) which is engaged by a pawl 424, fastened to shelf 407, so that the shaft 418 can only rotate in one direction. A ratchet 421 is loosely mounted on shaft 418, preferably within the recessed end of the ratchet 422 (Figs. 18, 19), and is engaged by a pawl 423 attached to ratchet 422. Connected with the ratchet 421, and similarly loosely mounted on the shaft 418, is a gear 420 (Figs. 19 and 22). A reciprocable rack bar 425 is held in mesh with gear 420 by the supporting roller 427, and reciprocating motion is imparted to the rack bar 425 by a cam 426 on shaft 23. A pivoted link 428 supports the rack bar adjacent the cam, and a roller 425ᵃ on the rack bar is held against cam 426 by a spring 425ˢ, which is of sufficient strength to operate the rack bar and cause the rolls 404 to feed the strip S. The strip must be fed rapidly; and it would be difficult to operate the roller 425 by the sharp incline 426ᵃ of cam 426; therefore I prefer to put the burden of feeding the strip on the spring 425ˢ.

The teeth of the ratchets 421 and 422 incline in opposite directions, therefore the motions of the spur gear 420 in opposite directions causes alternate advance movements and periods of rest of the feed roller 404. The printing of the stamp is done during the rest periods, and the strip S is advanced directly afterward.

A strip guide 406 is also fastened to the impression member 29ª (Figs. 3 and 4). This guide is made of sheet metal bent down at both sides where it is fastened in place by screws; an opening is cut in the top to expose the strip to the die 25. The top of the guide 406 overhangs the impression member a little at both ends, and in the overhanging end of the guide to the right, where the strip leaves, is a long narrow rectangular opening 406ª to permit the passage of the serrated strip cutter 408 which is fastened to the shelf 407.

The steps of printing, feeding, and cutting the tape are performed as follows:

Before starting the machine, the strip S should be in position under the guide 406, and between the rolls and printing members. Upon turning shaft 23 the impression member 29ª is first raised, making an imprint on the strip; the "impression" member is moved downward and during its downward movement the strip is fed forward, moving the printed portion out from under the die and moving a fresh clean portion into place under the die. This feeding operation is completed before the impression member 29ª is all the way down; and the contour of the cam 34, which controls the movement of the impression member 29ª, provides for a dwell during the operation of feeding the tape. As the impression member finishes its downward stroke, the guide 406 forces the tape down over the cutter 408 which passes entirely through the opening 406ª, and its serrated edge encounters the strip and severs the printed stamp therefrom, which then drops on the inclined part 407ª of the shelf.

*Automatic strip-controlled locking mechanism.*

The guides 402 and 403 are provided with coincident holes 403ª, Fig. 22, for the entry of the end 411ª of a trip finger 411, Figs. 17 and 22, when no strip is between the guides; the end 411ª of the finger being supported on and by the strip when it is in place between the guides.

The trip finger 411 is secured to one end of a shaft 412 (Figs. 3, 22, 38, 39) which is mounted in bearings on the left hand frame 2 and extends from front to back of the machine, its rear end lying under the support 4 on which the meter driving mechanism is mounted. The shaft 412 is shown as bent at 412ª (Fig. 3) to avoid interference with the shaft 27, but as shaft 412 can only make a fraction of a revolution this bend gives ample clearance.

On the rear end of shaft 412 (Figs. 3, 38, 39) is an arm 413, whose free end engages an opening in the bottom of a sliding bar 414 (hereinafter referred to) and raises or lowers said bar according to the position of the trip finger 411; holding the bar 414 raised when the finger 411 is resting on the strip S on guide 402, but if no strip is positioned between the guides 402 and 403 to support the finger 411, the latter will drop and thereby rock shaft 412 and arm 413 will allow bar 414 to lower.

The sliding bar 414 passes upward through the meter support 4 and to one side of the "meter pin" 212 and has a projecting head 414ª (Figs. 38, 39) which overhangs the meter pin 212; and if the bar 414 is lowered said head end 414ª drops on the meter pin 212 between one of its collars 212ª and the wall 4ᵇ of the support 4 and prevents the pin being moved toward said wall. This locks the machine because the meter pin 212 engages a hole in the gear 200 (Figs. 5 and 23) when the pin is in its "in" position, and prevents rotation of said gear and the gear 7 until the pin 212 is moved to its "out" position. If the bar 414 should lower at a time when the meter pin 212 was in its "out" position, the head 414ª would rest on top of the collar 212ª of the pin, and the machine could complete the operation then being performed, but upon completion thereof the pin 212 would be carried in and the head 414ª would then be disengaged from collar 212ª and the bar 414 would drop the rest of the way and head 414ª enter behind the shoulder 212ª and lock the pin in "in" position.

*Meter drive.*

The gearing for driving the meter is mounted on a support 4 mounted on frames 1 and 2 at the rear of the machine. This support is formed with a horizontal base and three transverse perpendicular walls 4ᵇ, 4ᶜ, 4ᵈ. The part of the support to the outer side of wall 4ᵇ has longitudinal side flanges 4ª, the internal surfaces of which, together with the intermediate part of the support 4, are machined to fit the base of the meter M, which can be slid into place or removed from the support, at the right hand side of the machine. Figs. 1 to 5 show the meter in place in the machine.

A horizontal shaft 210 (Fig. 5) passes through the walls 4ᵇ, 4ᶜ, 4ᵈ and has on its right hand extremity a castellated head 211 (Fig. 40) adapted to engage a similar castellated head 511 fixed to a shaft 510 in the meter; to transmit motion from shaft 210 to shaft 510 when the meter is in place in the machine.

The shaft 210 is driven by and from the index gear 7 through a combination of gear and ratchet wheels; and as the gear 7 is alternately turned forward and backward (always returning to the same starting point regardless of the amount it has been advanced) it is necessary to utilize its motion in one direction only, in driving the meter shaft 510, which should be moved only in one direction.

As shown (Figs. 5 and 23, 34, 35, 36) a pinion 209 mounted on shaft 210 meshes with a gear 201 mounted on a bushing 207, rotatably mounted on the hub 200$^b$ of a gear 200 rotatably mounted on a stub shaft 208 parallel to shaft 210 between the walls 4$^c$, 4$^d$. The pinion 200 meshes directly with the gear 7. To the end of the sleeve or hub 200$^b$ is attached a ratchet wheel 204 (Figs. 34–36) which is enclosed in a box 203, having a pawl 206 which engages the ratchet 204, Fig. 35. The box 203 is loosely mounted on the hub 200$^b$ and interposed between the box and the pinion gear 201 is a ratchet 202, Figs. 35, 36, and the box 203, ratchet 202, and gear 201 may be formed as a unit or pinned together as indicated in Figs. 34, 35, so that they are rotatable as one on the hub 200$^b$ of the gear 200. A bushing 207 may be placed around the sleeve if desired. A pawl 205 is pivoted on shaft 213, Figs. 5, 23, 36, and engages the teeth of ratchet 202.

The inclination of the teeth of the ratchet wheel 204 and the disposition of its engaging pawl 206 are such that when the gear wheel 200 and ratchet 204, are rotated in the direction of the arrow, Fig. 36, the teeth of ratchet 204 will slip under the pawl 206 and communicate no motion to the gear 201. The ratchet 202 and pawl 205 will positively prevent any revolution of gear 201 in the direction of the arrow; so that when the gear 200 is driven in the direction of the arrow (Fig. 36) the meter driving shaft 210 is not turned.

When however the gear 200 is rotated by the index gear 7 in a direction reverse to that indicated by the arrow in Fig. 36, the teeth of the ratchet 204 thrust against pawl 206 and cause the box 203, ratchet 204 and gear 201 to turn with it; the teeth of ratchet 202 slipping under the pawl 205; and the gear 201 meshing with the gear 209 causes the shaft 210 to revolve.

Either one of the alternating directions of movement of the index gear 7 might have been used in the movement for driving the meter but the return movement was selected owing to the fact that on its return movement the index gear 7 always stops at the same spot (that indicated by zero on the dial) thus making it possible to employ a positive stop for checking the momentum acquired by the revolving parts and preventing same overrunning. Such stop is shown in Figs. 3, 5, and 24.

*Lock and brake for meter actuating gear.*

As shown (Figs. 3, 23, 24) the stop consists of a catch 214 pivoted at 215 on the frame 2 and provided at its free end with a tooth 214$^a$. A pin or stud 216 is attached to the side of the gear wheel 7 in position to strike the catch 214 on the return movement of gear 7 and just before it reaches its "zero" position, and cause the tooth of the catch to engage the correct tooth-space in the spur gear 201 (Fig. 24) thus effectually preventing further movement thereof.

To guard against shock in locking the gears by catch 214 I provide a friction brake which is applied with gradually increasing pressure and arrests the movement of gear 201 before the positive stop 214 engages it.

This friction brake consists of a shaft 221 (Fig. 24) mounted between the walls 4$^b$ and 4$^a$, and having secured to it between the walls, a lever 219. On this shaft 221 directly under the cylindrical box 203 is loosely mounted a lever 217 to the free end of which is secured a brake shoe 217$^a$ which will engage the drum 203 when the brake is applied. A stop pin 217$^b$ arrests lever 217 when the shoe 217$^a$ is free from the drum 203. Securely fastened to the shaft 221 and extending below and directly under lever 217 is another lever 218; which carries a screw 222 and lock nut 223 (Fig. 24) for adjusting the tension of a spring 217$^s$, which is interposed between the levers 217 and 218. A stop pin 219$^b$ is provided to limit the downward travel of lever 219 when the pressure on spring 217$^s$ is entirely relieved. A stud 220 is fastened to the side of the rim of the index gear 7 in position to strike and lift the lever 219 on the return movement of gear 7, and just before it recedes to zero. The lifting of lever 219 will rock shaft 221 and lift lever 218, and lever 218 will cause spring 217$^s$ to raise lever 217 and apply the brake shoe 217$^a$ to the revolving drum 203; and as the lifting movement continues increasing pressure will be exerted on the brake shoe 217$^a$ through the cushioning spring 217$^s$. The action of this brake is timed to take place before the gear 201 is locked, and to reduce the momentum of the gears 7 and 201 to a point where the shock of locking same by catch 214 will be negligible.

*The meter-controlled means for locking the mechanism.*

The meter M is marked with a number by which it may be identified and the related printing machine has on it this same number (preferably engraved on its die) and each meter should be so constructed that it can be attached to no other machine except that one for which it was particularly designed.

To insure this non-interchangeability a lock is made part of the machine, and the key is made a part of the meter and it is necessary to position the meter to the machine in order to unlock the machine, and conversely, to lock the machine in order to detach the meter. By using a type of lock that has a wide range of combinations in the "bitting" of the keys, and by care in distributing the machines, the possibility of interchanging meters is practically obviated.

The "meter" with which the machine is adapted to cooperate may be such as described in my aforesaid Patent No. 1,370,-668 dated March 8, 1921, but the machine shown is more specifically designed to cooperate with a meter, as shown and described in my application, filed July 12, 1922, Serial No. 574,427.

As above explained the "meter pin" 212 is operated by the arm 40. And the inner end of the meter pin 212 is adapted to enter a hole 200$^a$ in the gear 200, and lock such gear and gear 7 when the pin 212 is in its "in" position; but when pin 212 is moved out however the gears 7 and 200 are free to turn. As previously explained immediately before the indexing of the gears begins the arm 40 causes the meter pin 212 to slide outwardly (to the right) thereby releasing gear 200; and causes it to slide back again (to the left) immediately after the index gears have been returned to zero. It is evident that no movement of the gears can take place when the meter pin 212 is in its "in" position.

The meter pin can be moved out only when the meter is in correct operative position; and there is mechanism in the meter (as described in my aforesaid patent and application) which will prevent the meter pin being projected into the meter, or moved to "out" position after the meter is "discharged"; or after the amount for which the meter has been "set" to permit the machine to print has been used. At such time the outer end of the pin 212 is prevented from entering the meter, and consequently the pin will be held in its "in" gear locking position and no further movement of the indexing gears can take place until the meter is reset.

It has also been explained how the meter pin 212 is prevented from being pushed out when the tape is exhausted. I will now explain the means whereby the meter pin 212 is prevented from being pushed out, when, or if, the meter is removed from its place in the machine.

In the drawings a pin-tumbler lock-cylinder 222 (Fig. 40) is fastened to the outside of the wall 4$^b$; said cylinder being encased, except at the key hole of the lock, in a cylindrical shell 223, which covers up the fastenings of the cylinder and is itself fastened to the wall 4$^b$ by screws from the inside of the wall. The casing 223 projects from the face of wall 4$^b$ into the space to be occupied by the meter.

The meter M has a hole 500$^b$ in its inner end wall 500, to receive the projecting lock case 223. A key 501 is secured to the end of a shaft 502 in the meter which shaft can be turned by a thumb grip 502$^a$, but has no longitudinal movement. The key 501 is located in the hole 500$^b$ in such position that as the meter is placed in position, the casing 223 enters the hole 500$^b$ and key 501 enters the cylinder 222 of the lock, lining up the pin tumblers. The plug 224 of the lock can then be turned by turning the thumb piece 502$^a$. This particular locking mechanism is more fully described and illustrated in my aforesaid application.

Two bolts 225, and 229, are operated by the turning of the lock. Bar 225 (Figs. 38, 39, 40) is slidably mounted on the inside of the wall 4$^b$, directly under and in line with the meter pin 212, and passes through the support 4, and its lower end is guided in a bracket 227 attached to the under side of support 4, and its upper end is guided by a piece 230 attached to wall 4$^b$ (Figs. 38–40). Two stops 225$^a$ and a tooth space 225$^b$ are machined in the bar 225 which are engaged by a one tooth cam 226 secured to the end 224 of the lock cylinder 222. When the bar 225 is moved upward its upper end will enter between the wall 4$^b$ and the adjacent collar 212$^a$ on the meter pin 212 and prevent the pin being moved to its "out" position.

The bolt 229 passes through openings in the support 4, and in the bracket 227 in front of the wall 4$^b$, and projects into the space occupied by the meter M. This bolt is adapted to enter a hole 505 in the bottom 506 of the meter. When bolt 229 is in its "up" position it locks the meter in place on the machine, as indicated in Fig. 40. Bar 229 has rack teeth 229$^a$ in its side meshing with a sector 228$^a$ pivoted at 228$^c$ between the bolt 229 and bar 225 below the support 4. The sector has an arm 228 provided with a ball-shaped end 228$^b$ which engages an opening 225$^c$ in the bar 225. When the bar 225 is raised the bolt 229 is lowered, the lever 228 being rocked by bar 225. When bar 225 is lowered bolt 229 is raised. When bar 225 is up, the meter pin 212 is held in engagement with gear 200 thus locking the machine; and bolt 229 is held down releasing the meter. When bar 225 is down the meter pin 212 is freed thereby unlocking the machine; and bolt 229 is raised locking the meter in place. By the means described the machine is always locked when the meter is detached; and the machine is unlocked and free to operate when the meter is in place, and the amount of prepaid postage for which the meter was "set" has not been used.

Drive.

In the machine shown the several cams required to furnish the proper motions at the proper times to various operative elements of the machine are secured to the cam shaft 23, as described, and illustrated, in the drawings. This shaft is the main actuating or power shaft, and motion may be imparted thereto by any suitable means, either manually or mechanical. I have simply shown said shaft as provided with a crank 47 on one end, by which it can be manually rotated; but the shaft can obviously be rotated by power applied directly or indirectly thereto from any suitable motor; the particular means used for driving shaft 23 being immaterial in the present case.

Operation.

As described, there are then, three distinct occurrances or conditions, any one of which will result in releasing or actuating means, which will prevent the meter pin 212 being moved to its "out" position, which is necessary to enable the machine to operate; these occurrences are (1) the strip S becoming exhausted or broken; (2) the meter becoming discharged; or (3) the meter being removed from the machine.

When the parts are all properly assembled and ready for operation the indexing lever 13 should be at the "zero" position against stop 3$^c$, and the locating lever 14 should also be in zero position against the lever 13, and the strip S is properly positioned in the machine with its end just adjacent the cutter 408 and the meter properly "set" in position in the machine and the date printing wheels 114, 115, 116, 117 properly set as described, so that the numerals showing the proper date are adjacent the die; a stamp of any desired denomination may be printed, as follows:

To print a stamp of say 82¢ denomination the operator moves the locating arm 14 clockwise around the dial until the figure 82 appears at the opening 14$^e$ in the end of the arm. The arm is then held in this position by allowing the indexing pin 14$^d$ to engage the related hole 3$^a$ in the dial.

The indexing lever 13 is then moved clockwise around the dial until it is arrested by the locating lever and held in this position by the catch 35. This movement of the indexing lever 13 has through the described gearing connection, caused the figure printing wheels 109, 110, 111 to move to a position where they will print the figures 082 on the face of the stamp. It has also caused the gears driving the meter to advance 82 teeth. The shaft 23 is then turned through one revolution, and during this revolution the impression is effected by the operation of the die 29$^a$ through the cam 34 and connections as described. Then the platen is retracted and after the printing the rollers 404, 405 are operated to feed the printed stamp forward over the receiver 407$^a$ and after the stamp is sufficiently advanced the platen descends and causes the knife 408 to sever the freshly printed stamp from the strip as above described. Thereafter the cam 8 is returned to its original position carrying back the indexing gear 7 and the indexing lever 13 until the latter is arrested by the stop 3$^c$, in "zero" position. When the lever 13 reaches zero position the meter pin 212 is retracted to lock the gear 200 and the indexing gear, and all the mechanism remains locked when each has completed its one effective single cycle of operations. This completes the operation and leaves the machine ready for another printing operation. If another 82¢ stamp is to be printed at the next operation of the machine, all that is necessary is to again move the index arm 13 from zero position clockwise until it is arrested by the locating lever 14 as above described, and then turn the cam shaft 23 one revolution, whereupon the aforesaid operations will be repeated.

If the next stamp to be printed is to be of some other denomination the locating lever 14 must be moved until a number corresponding to the denomination of the stamp desired, appears in the opening 14$^e$. Then the lever 14 is locked in such position, and the machine will operate to print such denomination of stamp upon moving of the indexing lever 13 from pin 3$^c$ clockwise until it is arrested by the lever 14; and then turning cam shaft 23 one revolution; the several operations being the same as in printing an 82¢ stamp, except that the indexing gear 7 will be moved a number of teeth corresponding to the denomination of the stamp to be printed, (i. e., the number which is visible through the opening 14$^e$), and the numeral printing wheels 109, 110, 111 will be positioned accordingly.

The indexing lever 13 and the figure printing wheels and gear 7 are always returned to zero after each printing operation, automatically, but the locating lever 14 is only shifted when it becomes necessary to change the denomination of the stamp to be printed.

When the meter used is similar to the meter shown and described in my aforesaid patent and application, the machine can be operated as described to print stamps of any desired denomination until the amount of postage for which the meter was "set" is exhausted. When that amount is exhausted the meter pin 212 is locked in "in" position, as described, thereby locking the gears 200 and 7, and preventing any further shifting of the numeral printing wheels or of the registering mechanism in the meter until the meter has been removed and reset. When the meter is removed from the machine the "out" movement of the meter pin 212 is prevented by the action of the automatic catch bar 225 until the meter is replaced in the machine.

When the machine is used for printing postage stamps (for which it was primarily intended) it can not be operated to print a stamp unless a meter as described is properly positioned in the machine; and when such meter is properly positioned in the machine; the amount of every stamp printed will be registered in the meter; and when the amount of postage for which the meter has been "set" is exhausted the machine will become automatically locked by the mechanism in the meter, as above described, until the meter is removed and reset.

While the machine is primarily designed and intended to be used for printing permit postage stamps, and in connection with my patented postage meter machines; it is adapted for printing tickets, etc., and in that case the meter and meter controlled locking devices need not be provided; and the machine can be used to print tickets of any desired denomination by shifting the locating lever 14 and indexing lever 13 as described, and then turning the cam shaft 23 as described; and the amount of each ticket printed could be totaled on a register which could occupy the place of the meter. The adaptability of the machine for uses other than printing prepaid postage stamps is obvious, and therefore I do not consider my invention limited to a machine constructed and used solely for printing permit postage stamps; nor to having such machine always used in connection with a controlling meter.

We do not in this application claim the specific feeding mechanism independent of the rest of the machine, nor the specific inking mechanism independent of the rest of the machine, as these are considered subject matter for divisional application.

What I claim is:

1. In a machine of the character specified, printing wheels, an indexing gear, gearing between the indexing gear and the printing wheels for setting the latter in accordance with the movement of the indexing gear; means for shifting the indexing gear in accordance with the number it is desired to print; means for taking an impression from the wheels when properly shifted; and means for returning the indexing wheel and printing wheels to zero position after the printing.

2. In mechanism as set forth in claim 1, means for feeding a strip of paper past the printing point to be impressed by the wheels, and means for severing the printed stamp from the strip.

3. In mechanism as set forth in claim 1, a set of date printing wheels adjacent the numeral printing wheels and means for adjusting the date printing wheels so that impression may be simultaneously taken therefrom by the same means that take the impression from the numbering wheels.

4. In mechanism as set forth in claim 1, a die adjacent the numeral wheels, and means for taking an impression from the die simultaneously with the impression from the numeral wheels, the die assisting in positioning the type members of the printing wheel at the impression point.

5. In mechanism as set forth in claim 1; means for feeding a strip of paper past the printing point to be impressed by the wheels; means for severing the printed stamp from the strip; a set of date printing wheels adjacent the numeral printing wheels; and means for adjusting the date printing wheels so that impression may be simultaneously taken therefrom by the same means that take the impression from the numbering wheels.

6. In mechanism as set forth in claim 1, means for feeding a strip of paper past the printing point to be impressed by the wheels; and means for severing the printed stamp from the strip; a die adjacent the numeral wheels, and means for taking an impression from the die simultaneously with the impression from the numeral wheels.

7. In mechanism as set forth in claim 1; a set of date printing wheels adjacent the numeral printing wheels; means for adjusting the date printing wheels so that impression may be simultaneously taken therefrom by the same means that take the impression from the numbering wheels; a die adjacent the numeral wheels; and means for taking an impression from the die simultaneously with the impression from the numeral wheels.

8. In combination with mechanism as set forth in claim 1; means for feeding a strip of paper past the printing point to be impressed by the wheels; means for severing the printed stamp from the strip; a set of date printing wheels adjacent the numeral printing wheels; means for adjusting the date printing wheels so that impression may be simultaneously taken therefrom by the same means that take the impression from the numbering wheels; a die adjacent the numeral wheels; and means for taking an impression from the die simultaneously with the impression from the numeral wheels.

9. In a machine of the character specified, a set of printing wheels, an indexing gear, gearing between the indexing gear and the printing wheels for setting the latter in accordance with the movement of the indexing gear wheel, an index plate bearing numbers corresponding to numbers to be printed, an indexing lever adapted to be shifted to any number on the index plate; means operatively connecting said lever with the indexing gear whereby the latter is shifted by and in accordance with the movement of the index lever; means for shifting the indexing gear in accordance with the number it is desired to print; means for taking an impression from the wheels when properly shifted, and means for returning the wheels and the indexing gear after printing to zero position.

10. In mechanism as set forth in claim 9, means for feeding a strip of paper past the printing point to be impressed by the wheels, and means for severing the printed stamp from the strip.

11. In mechanism as set forth in claim 9, a set of date printing wheels adjacent the numeral printing wheels; and means for adjusting the date printing wheels so that impression may be simultaneously taken therefrom by the same means that take the impression from the numbering wheels.

12. In mechanism as set forth in claim 9, a die adjacent the numeral wheels; and means for taking an impression from the die simultaneously with the impression from the numeral wheels.

13. In mechanism as set forth in claim 9, means for feeding a strip of paper past the printing point to be impressed by the wheels; means for severing the printed stamp from the strip; a set of date printing wheels adjacent the numeral printing wheels; and means for adjusting the date printing wheels so that impression may be simultaneously taken therefrom by the same means that take the impression from the numbering wheels.

14. In mechanism as set forth in claim 9, means for feeding a strip of paper past the printing point to be impressed by the wheels; means for severing the printed stamp from the strip; a die adjacent the numeral wheels; and means for taking an impression from the die simultaneously with the impression from the numeral wheels.

15. In combination with mechanism as set forth in claim 9 a set of date printing wheels adjacent the numeral printing wheels; means for adjusting the date printing wheels so that impression may be simultaneously taken therefrom by the same means that take the impression from the numbering wheels; a die adjacent the numeral wheels; and means for taking an impression from the die simultaneously with the impression from the numeral wheels.

16. In combination with mechanism as set forth in claim 9 means for feeding a strip of paper past the printing point to be impressed by the wheels; means for severing the printed stamp from the strip; a set of date printing wheels adjacent the numeral printing wheels; means for adjusting the date printing wheels so that impression may be simultaneously taken therefrom by the same means that take the impression from the numbering wheels; a die adjacent the numeral wheels; and means for taking an impression from the die simultaneously with the impression from the numeral wheels.

17. In a machine of the character specified, a set of printing wheels; an indexing gear, gearing between the indexing gear and the printing wheels for setting the latter in accordance with the movement of the indexing gear; an index plate provided with numbers corresponding to the number desired to be printed; an indexing lever; a locating lever adapted to be adjusted to any number marked on the index plate, and to limit the movement of the indexing lever; means operatively connecting the indexing lever with the indexing gear whereby the latter is moved by the index lever to cause the printing wheels to present the proper numerals at the printing point; means for taking an impression from the numeral wheels when properly shifted; and means for returning the index gear and printing wheels to zero position after the impression is taken.

18. In mechanism as set forth in claim 17, the index plate being in the form of a dial having numbers arranged around its circumference, and the index lever being pivoted at the axis of the dial and swingable around the same.

19. In combination with mechanism as set forth in claim 17, a set of date printing wheels adjacent the numeral printing wheels and means for adjusting the date printing wheels so that impression may be simultaneously taken therefrom by the same means that take the impression from the numbering wheels.

20. In combination with mechanism as set forth in claim 17, a set of date printing wheels adjacent the numeral printing wheels and means for adjusting the date printing wheels so that impression may be simultaneously taken therefrom by the same means that take the impression from the numeral wheels, a die adjacent the numeral wheels, and means for taking an impression from the die simultaneously with the impression from the numeral wheels.

21. In combination with mechanism as set forth in claim 17, a die adjacent the numeral wheels, and means for taking an impression from the die simultaneously with the impression from the numeral wheels, the die assisting in positioning the type member of the printing wheel at the impression point.

22. In mechanism of the character specified a dial plate, an indexing lever adapted to be moved over the dial; a locating lever adapted to be adjusted over said dial and operating as a stop to limit the forward or setting movement of the indexing lever; and means for arresting the return movement of the indexing lever at zero position.

23. In mechanism of the character specified in claim 22, a catch carried by the locating lever adapted to engage the indexing lever to lock the same to the locating lever.

24. In mechanism of the character specified in claim 22, a catch carried by the locating lever adapted to engage the indexing lever to lock the same to the locating lever, and means whereby the catch is caused to release the indexing lever upon the completion of a printing operation.

25. In mechanism of the character specified, a dial plate, an indexing lever adapted to be moved around the dial, means for arresting the return movement of the indexing lever at zero; a locating lever adapted to be adjusted over said dial to register with a number on the dial; and means to hold the locating lever in adjusted position, said locating lever operating as a stop to limit the forward or setting movement of the indexing lever.

26. In mechanism as set forth in claim 25, an oscillating catch carried by the locating lever adapted to engage the indexing lever to lock the same to the locating lever.

27. In mechanism as set forth in claim 25, an oscillating catch carried by the locating lever adapted to engage the indexing lever to lock the same to the locating lever, and cam actuated means whereby the catch is caused to release the indexing lever upon the completion of a printing operation.

28. In mechanism of the character specified, an indexing gear, a cam mounted beside the gear, means for permitting a limited rotatorial displacement of the cam and gear, means whereby the cam is caused to move by and with the gear in one direction; means whereby the cam is moved in the reverse direction upon the completion of a printing operation, and means whereby in returning the cam moves the index gear back to zero position.

29. In mechanism as set forth in claim 28 a pin on the gear, a catch on the cam adapted to engage the pin; and means whereby said catch is caused to engage and disengage the pin at the proper times in the rotatorial movement of the cam, substantially as described.

30. In combination with mechanism as set forth in claim 28, the cam having a slot, a pin on the gear entered in said slot, a catch on the cam to lock the same in the slot; and means whereby said catch is caused to engage and disengage the pin at the proper times in the rotatorial movements of the cam, substantially as described.

31. In combination with mechanism as set forth in claim 28, a dial plate, an indexing lever adapted to be moved over the dial; connections between said lever and the indexing gear for setting the latter; a locating lever adapted to be adjusted over said dial and operating as a stop to limit the forward or setting movement of the indexing lever, and means for arresting the return movement of the indexing lever and gear at zero position.

32. In mechanism of the character specified; an index plate, an indexing gear; an indexing lever; and connections for setting the indexing gear, a rotatable cam mounted beside the gear, means to permit limited rotatorial movement of the gear relative to the cam, the cam being moved by and with the gear during the indexing operation; means for positively returning the cam to normal position upon the completion of a printing operation, and means whereby the gear is returned by and with the cam, substantially as described.

33. In mechanism as set forth in claim 32, a catch on the cam adapted to engage a pin on the gear and lock the same against relative movement; and means whereby said catch is caused to engage and disengage the pin at the proper times, substantially as described.

34. In mechanism as set forth in claim 32, the cam having a slot, a pin on the gear engaging the slot to permit limited rotatorial movement of the gear relative to the cam; a catch on the cam adapted to engage the pin on the gear and lock the same against movement in the slot; and means whereby said catch is caused to engage and disengage the pin at the proper times, substantially as described.

35. In combination with mechanism as set forth in claim 32, a dial plate, an indexing lever adapted to be moved around the dial; connections for actuating the index gear by said lever; means for arresting the return movement of the indexing lever and gear at zero; a locating lever adapted to be adjusted over said dial to register with a number on the dial; means to hold the locating lever in adjusted position; said locating lever operating as a stop to limit the forward or setting movement of the indexing lever.

36. In mechanism of the character specified, a printing die mounted on a swingable support; an impression member mounted on a swingable support opposite the die; means for feeding a strip between the printing and impression members; means for raising and lowering the impression member, and means for raising and lowering the die.

37. In mechanism of the character specified a printing member mounted on a swingable support, an impression member, means for feeding a strip between the printing and impression members, a toggle for raising and lowering the impression member, cam actuated devices for raising and lowering the printing member, and cam actuated devices for straightening and breaking the toggle.

38. In mechanism of the character specified, a printing die, a set of printing wheels mounted adjacent the die and provided with radially disposed type carrying arms adapted to imprint the die when at the printing point, means engaging the arms to hold them at the printing point and an impression member, and means for operating the impression member.

39. In mechanism of the character specified, a printing die mounted on a swingable support, a set of printing wheels mounted adjacent the dies and provided with radially disposed type carrying arms adapted to imprint with the die when at the printing point, means engaging the arms to hold them at the printing point, an impression member, and means for feeding a strip between the die and impression member.

40. In combination with mechanism as set forth in claim 39, a toggle for raising and lowering the impression member; cam actuated devices for straightening and breaking the toggle, and cam actuated devices for operating the die member.

41. In mechanism of the character specified, a printing die having slots, printing wheels mounted adjacent the die and provided with radially disposed type carrying arms adapted to engage the slots in the die when at the printing point, an impression member, and means for feeding a strip between the die and impression members.

42. In combination with mechanism as set forth in claim 41, a toggle for raising and lowering the impression member, cam actuated devices for straightening and breaking the toggle, and cam actuating devices for operating the die member.

43. In mechanism of the character specified, an index gear, a gear meshing therewith, a ratchet connected with the hub of said gear, a pinion rotatably mounted between said ratchet and gear, a ratchet secured to said pinion, a casing connected with said latter ratchet and surrounding the first ratchet, a pawl in said casing engaging said first ratchet, a fixed pawl engaging said second ratchet; said ratchets facing in opposite directions, substantially as described.

44. In combination with mechanism as set forth in claim 43, a brake adapted to engage said casing, and means operated by the indexing gear for actuating said brake on the return movement of said gear.

45. In combination with mechanism as set forth in claim 43, a catch for locking said gear when the index gear returns to zero position, and means for operating said catch by the movement of the index gear.

46. In combination with mechanism as set forth in claim 43, a brake adapted to engage said casing, means operated by the indexing gear for actuating said brake on the return movement of the gear; a catch for locking said gear when the index gear returns to zero position, and means for operating said catch by the movement of the index gear.

In testimony that I claim the foregoing as my own, I affix my signature.

ARTHUR H. PITNEY.